United States Patent [19]

Kaneko et al.

[11] Patent Number: 5,306,888
[45] Date of Patent: Apr. 26, 1994

[54] WIRE CUT ELECTRICAL-DISCHARGE MACHINING APPARATUS

[75] Inventors: Yuji Kaneko; Hideo Nishimura, both of Sakai, Japan

[73] Assignee: Sodick Co., Ltd., Yokohama, Japan

[21] Appl. No.: 984,561

[22] PCT Filed: Jul. 3, 1992

[86] PCT No.: PCT/JP92/00846
§ 371 Date: Apr. 15, 1993
§ 102(e) Date: Apr. 15, 1993

[87] PCT Pub. No.: WO93/01018
PCT Pub. Date: Jan. 21, 1993

[30] Foreign Application Priority Data

Jul. 5, 1991 [JP] Japan ................. 3-165915

[51] Int. Cl.[5] .............................................. B23H 7/04
[52] U.S. Cl. ................................................... 219/69.12
[58] Field of Search ............... 219/69.12, 69.13, 69.17, 219/69.18, 69.19

[56] References Cited

U.S. PATENT DOCUMENTS

| | | | |
|---|---|---|---|
| 4,329,558 | 5/1982 | Martin | 219/69.12 |
| 4,559,432 | 12/1985 | Itoh | 219/69.12 |
| 4,575,605 | 3/1986 | Martin | 219/69.12 |
| 4,652,717 | 3/1987 | Briffod et al. | 219/69.12 |
| 4,675,491 | 6/1987 | Marendaz | 219/69.12 |
| 4,691,089 | 9/1987 | Balleys | 219/69.12 |
| 4,963,711 | 10/1990 | Obara | 219/69.12 |

FOREIGN PATENT DOCUMENTS

| | | | |
|---|---|---|---|
| 53-64899 | 6/1978 | Japan . | |
| 60-29230 | 2/1985 | Japan . | |
| 62-15017 | 1/1987 | Japan . | |
| 62-44317 | 2/1987 | Japan | 219/69.12 |
| 62-54626 | 3/1987 | Japan | 219/69.13 |
| 62-152616 | 7/1987 | Japan | 219/69.12 |
| 63-109915 | 5/1988 | Japan . | |
| 63-288626 | 11/1988 | Japan . | |
| 3-86427 | 4/1991 | Japan . | |
| 4-129617 | 4/1992 | Japan . | |

*Primary Examiner*—Geoffrey S. Evans
*Attorney, Agent, or Firm*—Marks & Murase

[57] ABSTRACT

An apparatus for preventing damage and malfunction to workpiece and electrode travelling system by quickly and reliably detecting wire electrode breakage during the wire cut discharge machining and, in the event of breakage, stopping machining or the like. Unlike conventional mechanical detecting means and devices for detecting the severing of a wire electrode from its supply reel, the present apparatus detects the position of the spark discharge pulse along the axial direction of the wire electrode to determine whether the location is inside or outside the thickness of the workpiece. If the spark position is outside the workpiece thickness and continues for a predetermined time period, the apparatus determines that a wire breakage exists. In addition, the apparatus attempts to discriminate a wire electrode breakage from other malfunctions, especially when the spark position is detected as occurring outside the workpiece thickness, and if a feed member wear situation is detected, the position of the sliding contact of the feed member can be updated.

41 Claims, 12 Drawing Sheets

FIG. 4
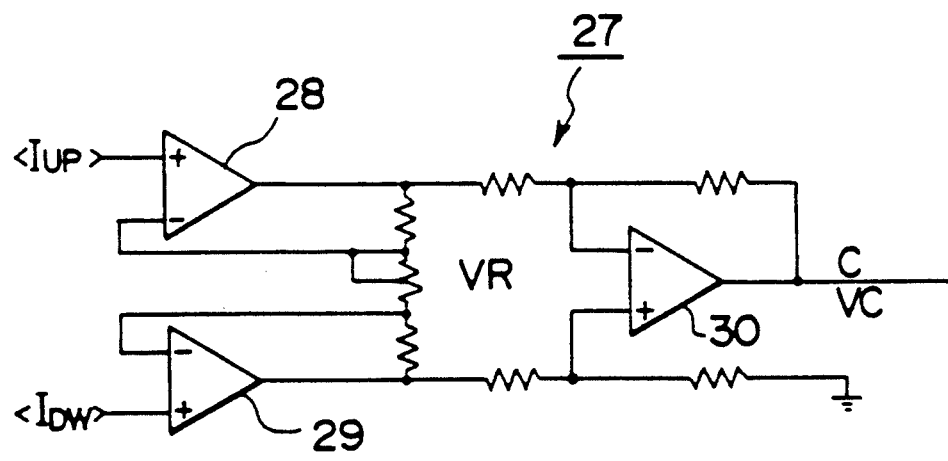
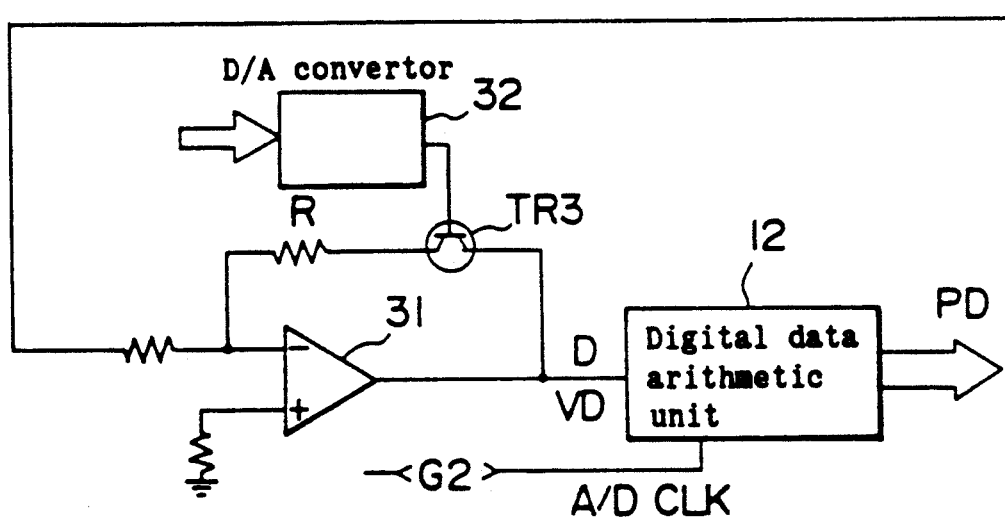

WIRE CUT ELECTRICAL-DISCHARGE MACHINING APPARATUS

TECHNICAL FIELD

The present invention relates to a technique for detecting the position along the axial direction of a wire electrode of an electrical-discharge wire cutting machine ("WC-EDM") where spark discharges are generated. The invention further relates to a wire breakage detection apparatus and apparatus for detection of the wear of upper and lower electrical feed members.

BACKGROUND ART

A typical wire cut electrical-discharge machining apparatus uses a thin wire of about 0.05 to 0.35 mm in diameter as an electrode tool. The wire is disposed under a predetermined tension between a pair of guide members in such a manner that the portion of the wire in the working zone can be renewed by axial displacement while maintaining the wire under tension.

A contour may be cut in the workpiece to be machined by moving the workpiece with respect to the wire electrode and in a direction which is generally orthogonal to the axis of the wire electrode, while maintaining a minute gap between the wire and the workpiece and under conditions wherein a working fluid is introduced into the gap between the wire and work piece. Contour machining is carried out by impressing voltage pulses across the gap between the wire and the workpiece and moving the workpiece with respect to the wire electrode in order to establish a work feed in the desired machining direction.

However, unless suitable operating conditions are maintained during machining, wire breakage is apt to interrupt production.

Recently, WC-EDM's have been available which have included a self-recovery means for dealing with wire electrode breakage. More specifically, WC-EDM's have been provided with functions for automatically inserting and joining the wire electrode ends. However, these arrangements do not necessarily assure 100% effective or reliable automatic wire electrode insertion and joining. Further, even if a repair is appropriately achieved, the rethreading function not only wastes time but also generally impairs machining accuracy, finish, and the like. Hence it is preferable in the first instance to avoid the causes of wire breakage.

When wire cut electrical-discharge machining, a number of problems which tend to cause wire breakage may be encountered. It is usually impossible to carry out high speed machining with accuracy and high efficiency unless high-load working conditions, and in particular electrical conditions such as voltage pulse width, off time duration and amplitude of the discharge current, and machining feed control, are established and controlled. However, when machining under high load conditions, there is a higher risk of wire breakage. In addition, for precision machining, other conditions, such as high wire tension and the like, are required which exacerbate the danger of wire breakage.

Therefore, some recent WC-EDM's have included devices to carry out various detection and control strategies in order to prevent wire electrode breakage. Further in the event of wire electrode breakage, some recent WC-EDM's have included devices to quickly detect the break and, thereafter, execute a control function which at least temporary arrests the supply of machining voltage pulses or power, or arrests the travelling (renewal) of the wire electrode, or temporally arrests the machining action including cutting off the work fluid supply, machining feed and the like. This is done to prevent malfunctions and the consequences of such abnormal failures on the workpiece, the working fluid nozzle, the supply and travel systems for the wire electrode and the like in the event of wire electrode breakage.

However, the foregoing broken-wire detection systems are not necessarily as quick as desired. Accordingly, it has been difficult to avoid obstacles to machining progress and accuracy due to excessive detection and control, and problems involving different failures which result from delays in adaptive control.

There are various type of wire electrode broken-wire detectors or broken-wire detecting control devices already available for conventional wire cut electrical-discharge machining apparatus. However, most of these devices are of the type wherein discrimination is based on detection on the outboard side of the supply side guide member, i.e., between the supply side guide member and the supply reel and at a location such as along the wire feed path along or at structures positioned between the supply reel and the supply side guide member over which the wire is strung, and/or on the outboard side of the take up side guide member and used wire recovery member. Typical devices use sensors with contact(s) such as limit switches and photodiode sensors, or operate to detect the tension and/or change in travelling speed of the wire electrode.

However, as most wire breakage occurs proximate the workpiece and between the upper and lower guide members, the indirect detection at the outboard sides of the interspace between the guide members has resulted in a problem in that accurate detection by the various sensors is delayed.

As disclosed in JP-A-53-68496 for example, it is known to arrange a current source to supply a minute current, which is not directly related to the working current, to the wire electrode from feed members disposed above and below the work table on which the workpiece is fixed, and to use a current detector to detect any fluctuation of the minute current. This permits detection of a break in the electrode wire by detecting when the minute current drops to zero.

However, the above broken-wire detector is so arranged that minute currents are by necessity supplied from the current source to the feed members above and below the workpiece. Therefore, it exhibits the disadvantage of being in contact with the machining power supply by way of the upper and lower feed members and the workpiece. The minute current flows from the current source through the incoming line for machining power at the time of breaking of the wire electrode. This inhibits positive detection of a wire break condition.

In addition, with this type of broken-wire detector, in some cases it is possible that for a short time after a wire break occurs, both free end pieces of the wire in the vicinity of the break will make repeated contact with locations on the workpiece and with other electrically conductive material adjacent to the wire electrode guide path, thus preventing the minute currents from being immediately and completely cut-off. This often results in delayed detection of a wire break.

In addition, as above described, the present invention relates to an improvement in detection of wear of one or both of the feed members. This is because, in the case where wire breakage detection is carried out using a method where detection is accomplished through the electrical power supply elements using the electrical power supply circuit, it can by-pass the above mentioned wear detection means.

By way of example, JP-A-60-108226 discloses a wire cut electrical discharge machine comprising a plurality of feed members which are provided with diodes which causes electrical current to flow in the same direction. These feed members are connected to a power source, of either direct or alternating current, of a predetermined magnitude. The electricity from the power source is supplied by way of an impedance element and wire breakage is detected by comparing the voltage across the ends thereof with a reference value.

In JP-A-63-109915, an electrical-discharge machine is disclosed which includes a circuit which supplies electric energy to the workpiece from the feed members, a wire electrode break detecting circuit to detect a break of the wire electrode, means to detect the current flowing from the electrical-discharge machining power circuit into the wire electrode break detecting circuit when wear of the feed members occurs, and means to detect the machining speed. With this arrangement, the values detected by the current detecting means and machining speed detecting means are compared with respective standard values and the time for replacement appropriately indicated.

However, both of these wire electrode break detecting means suffer from delayed detection in that both working current and any separate current, both flow through the wire electrode. Further, as the feed members wear, the electrode break detecting means, and similar types of detection means and arrangements which are associated with the establishment of electrical contact by the electrical feed members, suffer impaired detection accuracy.

In addition, in JP-A-4-129617, an electrical-discharge machine is disclosed wherein the existence of an abnormality is determined on the basis of the detected voltage, and includes means for detecting the voltage between the wire electrode and the feed members. However, in order for the voltage at a location immediately adjacent the feed members to be detected, it is necessary to provide a contact which is separate from the feed members and used only for the detection of the wire electrode voltage. This not only leads to a complicated and costly arrangement, it also leads to a situation wherein an abnormality due to detecting conditions at the contacts may occur. This of course renders accurate detection unlikely.

OBJECTS AND SUMMARY OF THE INVENTION

In view of the above drawbacks, it is a general object of this invention to provide an arrangement which, in order to detect the wire electrode break at the location where the wire is actually effecting machining and in portions proximate thereto, every time a spark discharge pulse occurs, the position of spark discharge in the axial direction of the wire electrode is detected (preferably with a high degree of accuracy), and which is capable of distinguishing between situations where the above-mentioned spark-discharge position is located within a workpiece from situations where the spark-discharge position is outside the workpiece. Precise and reliable wire electrode break detection is quickly achieved based on the frequency with which spark-discharge positions occur outside the workpiece.

It is a further object of this invention to provide an arrangement which, when the spark-discharge positions outside the workpiece thickness are detected, and no signal indicating wire break is generated within a predetermined time, issues a signal indicative of electrical supply contact wear. In response to this wear indication, a determination is made as to which of the upper or lower feed members is worn based on the location (i.e., outside the workpiece) where the spark discharge pulse occurred.

The present invention also provides a technique for detecting wire electrode break and wear of feed members, as noted above. This is achieved by detecting the spark-discharge positions in the axial direction of the wire electrode in between the upper and lower feed members, each electrical feed member being positioned on one side of the workpiece. In other words, on the basis of machining voltage pulses supplied to the wire electrode through the feed members from one terminal of the machining power supply, it may be determined whether the electric energy has travelled to some position outside the work piece thickness, or on the other hand, back to the other terminal of the machining power supply after flowing through intervening material adjacent to the material to be machined. By processing the signals from the above detected spark-discharge positions, it is possible to determine both wire breakage situations and feed members wear.

The state of the technology to detect a spark-discharge position in wire cut electrical-discharge machining can be summarized as follows:

JP-A-53-64899 discloses a voltage measuring circuit which detects fluctuations of electrical resistance between sparking points, feed members and the workpiece, with respect to the wire electrode by measuring the voltage across the same. This enables the spark-discharge positions to be measured or detected.

JP-A-59-30621 discloses that by measuring the current value flowing into either one or both of the upper and lower feed members, a spark-discharge position can be detected through a current waveform which is a function of inductance at the sparking point. Further, from JP-A-62-15017, it is known that currents flowing to the wire electrode through the upper and lower electrical feed members may be detected by individual current comparators, and that a signal representative of the difference between the currents flowing into both current comparators may be derived via differential amplification, to thereby indicate a spark-discharge position.

Even though the invention which is disclosed hereinafter can make use of such prior art if desired, it is preferable for the spark-discharge position to be detected using detection signals, as described hereinafter, which provide even higher accuracy.

In order to achieve the above as well as other objects and advantages, a wire cut electrical-discharge machining apparatus according to a first inventive aspect of the present invention may comprise a wire electrode which is supplied on a renewing feed basis in the axial direction under conditions wherein the wire electrode extends between upper and lower guide members and upper and lower feed members which are respectively disposed on either sides of the workpiece to be machined, and wherein machining is carried out by generating spark discharge pulses by impressing voltage pulses on a periodic basis across the machining gap formed between the workpiece and the wire electrode while a working fluid fills the machining gap. The position where spark discharges occur may be determined using a sampling of the electrical discharge machining pulses. The arrangement preferably includes a current comparator for detecting the current flowing into one or both of the electrical feed members due to spark discharges generated from the application of the machining voltage pulses, a spark-position detecting means for amplifying output signals from said current comparator(s) and for issuing a signal indicating the position along the electrode wire, between the pair of feed members, at which the discharges occurred, a digital data arithmetic unit for converting the signal from said spark position detecting means into digital data indicative of the spark discharge position, and a setting device which, when a discharge is generated at or about the center position along the axial direction of the wire electrode, uses the digital values generated by the digital data arithmetic unit as standard upper and lower values of plate thickness suitable as settings for the upper and lower limits for the spark discharge position.

Further, there may be included a workpiece thickness inside/outside detector for spark discharge positions which outputs a signal indicative that a spark is outside workpiece thickness when the digital data corresponding to the spark generation location, which is output from the above-noted arithmetic unit upon a generation of spark discharge pulse in the machining gap, is outside the digital values e.g. above the lower limit and below the upper limit, set by the upper limit and lower limit adjusters. A broken-wire-electrode discriminator, which outputs a wire electrode break signal when it is determined that the spark discharge position is outside the workpiece thickness, is also preferably included.

In order to increase the accuracy of the spark discharge position detection, it is preferable to provide, in the broken-wire-electrode discriminator, an arrangement comprising: upper and lower peak holding circuits for holding the peak currents detected by the upper and lower current comparators each time a spark discharge is generated, a spark-position detecting means in the form of a difference amplifier, for determining the difference between the peak currents latched by the peak current holding circuits to thereby produce a signal relating to the spark position, and in order to convert the output values from the difference amplifier into digital data representing information relating to the spark discharge position within an extremely short period of time after the termination of the gate signal, a time delay circuit for the gate termination signal may be advantageously provided in the digital data arithmetic unit for determining spark discharge positions.

In addition, it is preferable to arrange the broken-wire-electrode detection device so that in use, the accuracy of detecting the spark discharge positions does not decrease or vary as the predetermined electrical machining conditions are changed. When the spark position signal obtained through the difference amplifier is supplied to the arithmetic unit, those signals are converted into digital data indicative of the spark discharge position. The degree of amplification of the circuit for amplifying the spark position signal may vary according to the predetermined machining conditions such as those relating to the width or duration of a machining pulse, and it is preferable to allow for alteration of that amplification, such as by a setting.

In addition, as the preferred embodiment of the device used as the wire electrode breakage discriminator, it is preferable to include a spark position inside/outside the workpiece thickness detector for outputting a signal indicative that the spark position is within the workpiece thickness in the event digital data indicative of discharge position from the arithmetic unit is within the above-noted digital data values, i.e., less than the upper limit and more than the lower limit established by the upper and lower limit adjusters. The wire electrode breakage discriminator may also preferably include a counter for counting the position signal indicative of whether the spark is inside/outside the workpiece thickness, the counter being arranged so that the spark position signals indicative of a spark position outside the workpiece thickness are integrally counted. The integrated count of the outside-the-workpiece thickness spark position signals is cleared by the input of an inside-the-workpiece thickness spark position signal, and a broken-wire-electrode signal is output to the wire cut electrical-discharge machining control device when the integrated count of the outside-the-workpiece thickness spark position signals reaches a predetermined value.

Moreover, in accordance with another aspect of the present invention, a wire cut electrical-discharge machining apparatus is provided which comprises, in the forgoing first device, a further device for generating an electrical feed member wear detecting signal when the number of outside-the-workpiece thickness spark position signals reaches a preset value which is significantly smaller than the value set for the wire electrode breakage discriminator. Such detection is done in accordance with the output of the detection signal relating to the outside-the-workpiece thickness spark position signal, which is output by the inside/outside workpiece thickness position spark detection. The distinct feature of this aspect of the invention is a device which outputs an electrical feed member wear discrimination signal, if, after the input of said wear detection signal, no wire electrode breakage signal is output by the wire electrode break discrimination device within a preset time period.

Further, with respect to the second aspect of the invention, it is preferable to provide an arrangement comprising: a logic circuit which generates an upper or lower wear detecting signal using the outside workpiece thickness spark position signals and the feed member wear detecting signal output by said inside/outside workpiece thickness detector, and a device for outputting an upper or lower wear discrimination signal to a display associated with the wire cut electrical-discharge machining control device and to provide a warning by means of the wear discriminating signal and said logic circuit signal for the above-stated electrical feed member wear discriminator.

BRIEF DESCRIPTION OF DRAWINGS

The accompanying drawings, which are incorporated in and form a part of the specification, illustrate the presently preferred embodiments of the present invention and, together with the description, serve to explain the principles of the invention. In the drawings:

FIG. 4 is an illustration of the circuit connections for the differential amplifier of the spark-position detecting means 11 and the digital data arithmetic unit 12 for detecting spark discharge positions in FIG. 1;

DETAILED DESCRIPTION OF THE INVENTION

A presently preferred of the present invention will now be described.

Figure 1:
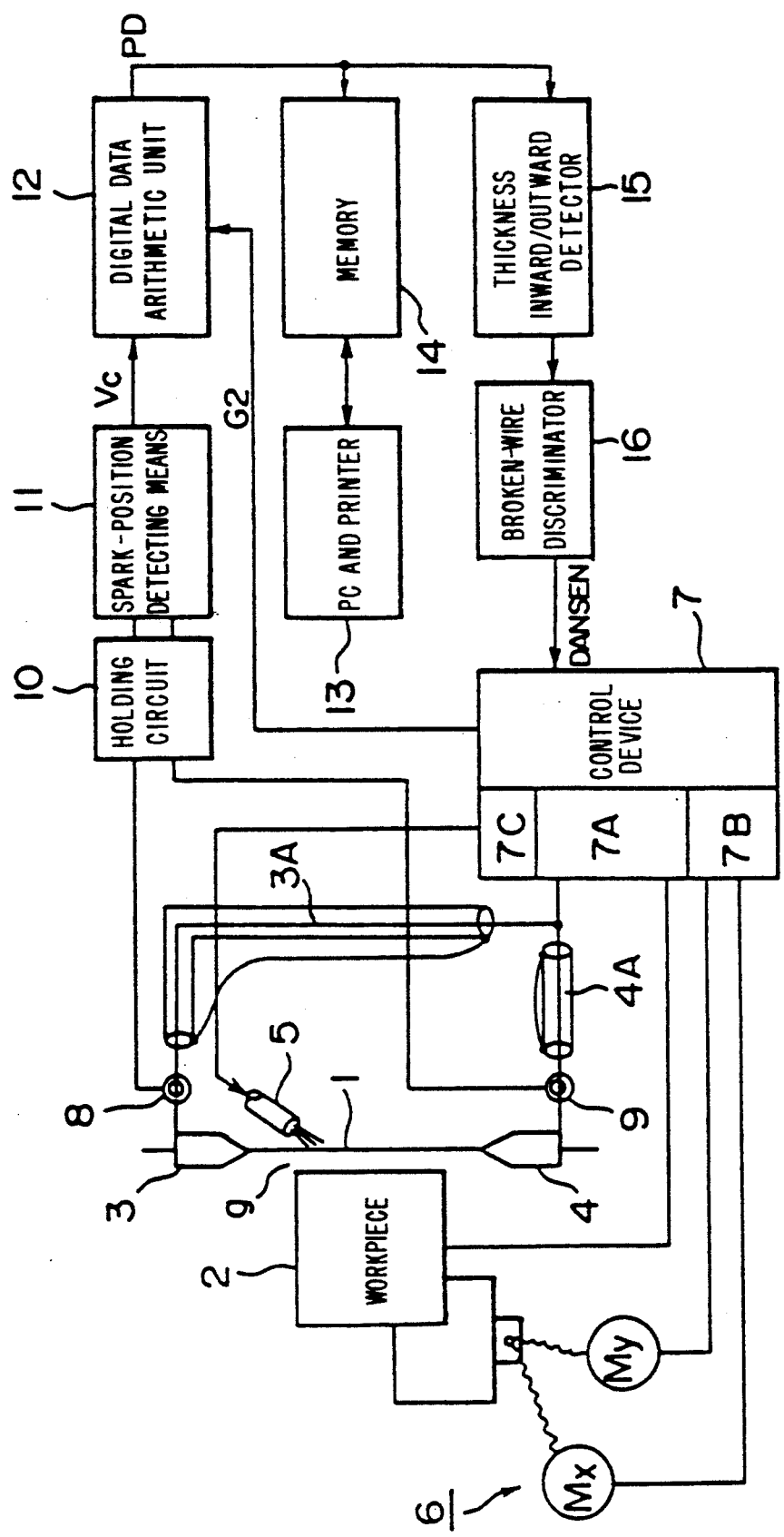
FIG. 1 is a block diagram representing the general arrangement of a first embodiment of the present invention.

FIG. 1 is a block diagram illustrating first and second embodiments of the present invention. In this figure a wire electrode 1 is renewably fed in its axial direction under conditions wherein a predetermined tension is applied to the portion of the wire which extends between a pair of spaced positioning guides which are separated by a predetermined distance. Machining is carried out by moving a workpiece 2 in a direction essentially normal to the axial direction of the electrode wire 1 until it is spaced from the electrode wire by a very small gap g. Voltage pulses are supplied to and impressed across the gap between the workpiece 2 and the wire electrode 1 from a wire cut electrical-discharge machining power supply 7A (FIG. 2) by way of upper and lower interpole lines 3A and 4A and upper and lower electrical feed members 3 and 4 under the conditions wherein a working fluid is ejected from a nozzle 5 and induced to flow in the gap g. This generates periodic sparking pulses. Relative machining feed is provided in the horizontal plane at right-angles to the axial direction of the electrode wire through a feeding mechanism 6 having X and Y axis feed motors Mx and My which produce movement in the X-Y plane. Reference numeral 7B represents a machining feed driving circuit, reference numeral 7C represents a working fluid supply circuit, and reference numeral 7 represents a wire cut electrical discharge machining control device incorporating a NC unit which carries out settings, changes and controls for the power supply 7A and circuits 7B and 7C based on established working conditions, programs and various control signals.

Reference numerals 8 and 9 respectively denote current detectors which monitor the electrical discharge current flows which pass through the upper and lower feed members 3, 4 to the wire electrode as the abovementioned machining discharge pulses are generated.

Reference numeral 10 denotes a holding circuit which is usually provided with a sampling circuit, which is preferably provided to receive the inputs from the current sensors 8, 9, and which, by way of example, may be used to latch the current signal which is produced in synchronism with the termination of the machining pulse gate signal.

In accordance with the present invention, the presently preferred mode of practicing the above-mentioned hold circuit 10 is to use a peak hold circuit (FIG. 3) which latches to the maximum value of the detected current signal.

Reference numeral 11 denotes a spark position detection means which amplifies the output of the machining current detectors 8, 9 or the output of the peak held values for detecting the position along the wire electrode between the feed members 3, 4 at which a spark occurred.

In the case where a pair of upper and lower current comparators 8 and 9 are used, which is the more desirable mode of carrying out the present invention, an arrangement including a difference amplifier (FIG. 4) is provided for differentially amplifying both detected signals or held signals.

Reference numeral 12 denotes a digital data arithmetic unit (FIG. 4) for converting the spark position signal, which is indicative of the spark discharge positions and which has been amplified by said spark-position detecting means 11, into digital data, e.g., eight-bit digital data.

Reference numeral 14 denotes a memory for storing the digital data PD which is indicative of the spark discharge positions output by said arithmetic unit 12

Reference numeral 13 denotes a PC with printer for carrying out the required operation and processing of the digital data stored in said memory 14 in response to the operator control and for generating hard copies if desired.

Reference numeral 15 denotes inside/outside workpiece thickness detector (FIG.9) for determining, in accordance with the digital data PD delivered from said arithmetic unit, whether the spark discharge positions are within a thickness of the workpiece 2 during machining; in other words, whether discharge machining is occurring to material other than the intended workpiece.

Reference numeral 16 denotes a broken-wire discriminator (FIG. 9) which issues a broken-wire-electrode signal (DANSEN) whereby said wire cut electrical-discharge machine at least stops its machining motion in the event that a count in excess of predetermined level occurs, e.g., the signals produced by the inside/outside workpiece thickness detector indicative of a spark occurring outside the workpiece thickness exceeds a predetermined number.

Reference numeral 7 denotes the control device which receives a broken-wire-electrode signal(-DANSEN) from the discriminator 16, and at least stops supplying the working voltage pulses generated by the machining power supply 7A to thereby stop machining. Alternatively, as a further measure, the wire electrode feed can be temporarily stopped and/or the operation of the control device 7 stopped.

Figure 2:
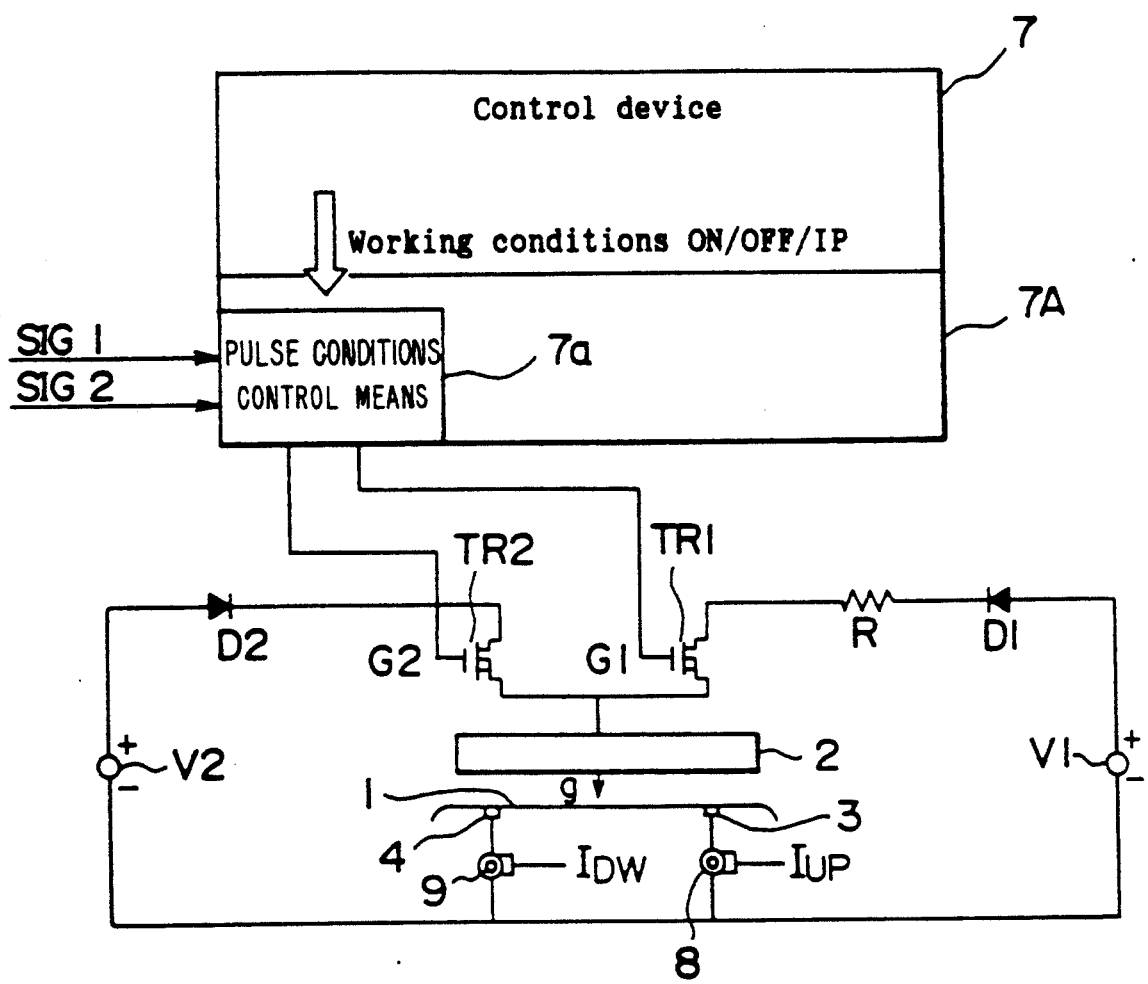
FIG. 2 is an illustration of a connecting circuit for the parts of a power supply 7A and a control device 7 for the WC-EDM of FIG. 1.

In FIG. 2, reference numeral 7A denotes a wire discharge machining power supply pulse control for a two-power source supply, one for producing a high voltage, at a low amperage current, and another for producing a low voltage at high amperage current. Source V1 is an auxiliary power source for supplying the high voltage, small amperage current; e.g., a voltage of about 300 volts. Source V2 is the main machining power source which, as compared with the auxiliary source V1, produces about 100 volts. It is the source of the low voltage, high amperage current. Diodes D1 and D2 are protective diodes which prevent reverse current flow. Resistor R is a current flow control resistor. Transistors TR1 and TR2 are ON/OFF switching elements for said auxiliary supply V1 and main supply for machining V2, respectively. Signals G1 and G2 are gate signals which are supplied to the switching elements TR1 and TR2, respectively.

The gate signals G1 and G2 are input to the gate electrodes of the respective switching elements TR1 and TR2 which preferably consists of MOS.FET type transistors. The gate signals are generated by the pulse condition setting and control section 7a of the machining power source control 7A which in turn is set and controlled by the wire spark machining control device 7 which also encompasses the above noted NC control device.

Accordingly, voltage or spark pulses are supplied between the wire electrode 1 and workpiece 2 with desired polarity, voltage or sparking duration, quiescent time, and current value.

Figure 3:
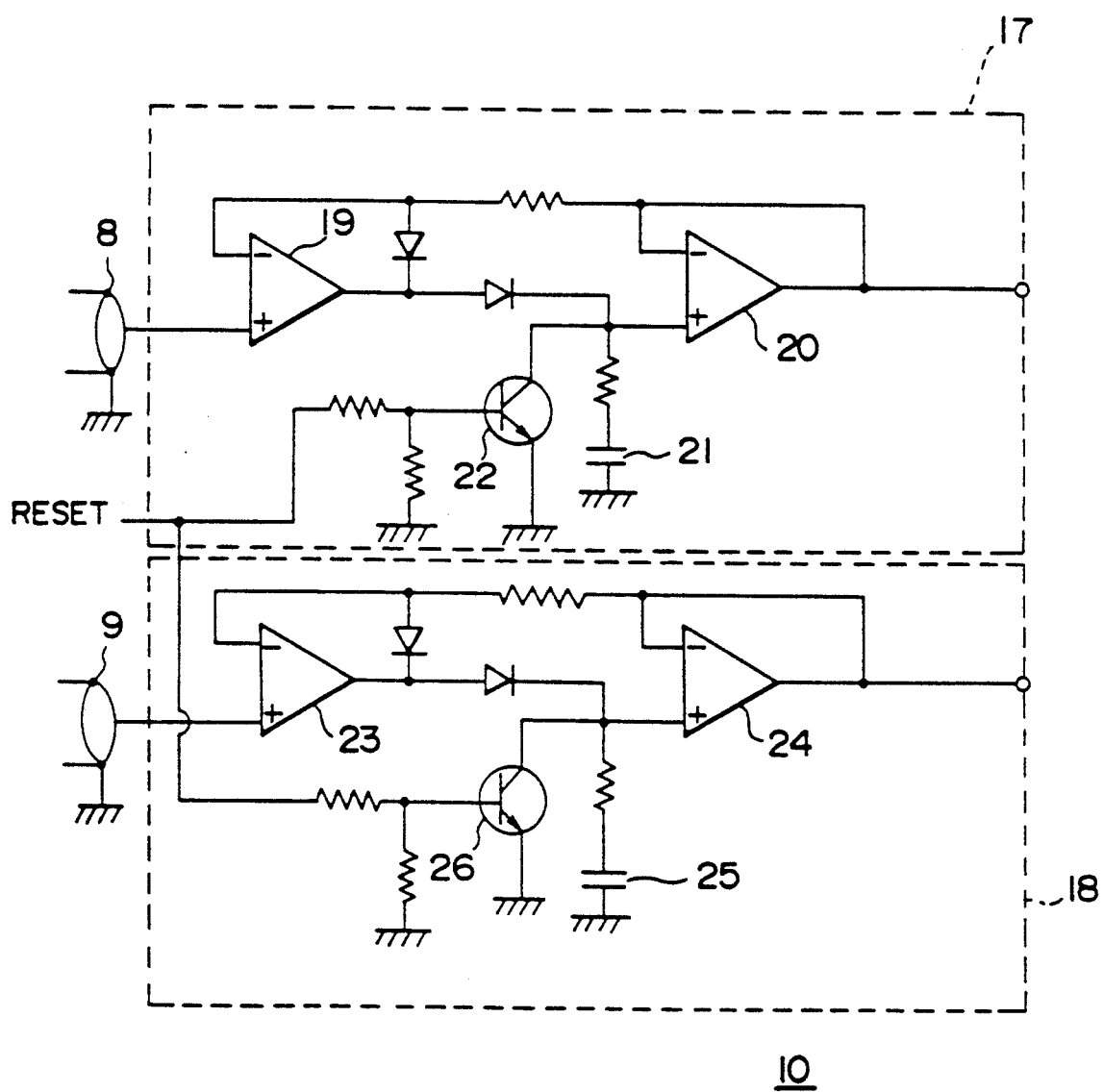
FIG. 3 is an illustration of a peak holding circuit as an example of the holding circuit of FIG. 1.

FIG. 3 illustrates an example of a preferred embodiment of a peak holding circuit for the sample and hold circuit 10 for the detected signals from the current detectors 8 and 9. The peak holding circuit 10 outputs a spark position signal to the spark position detecting means 11 after amplifying the detected current signals.

The illustrated embodiment comprises upper and lower peak holding circuits 17 and 18 for the current detectors 8 and 9, respectively, which contemplates detection at both the upper and lower electrical feed elements as a preferred embodiment for carrying out the present invention. The above noted peak holding circuits 17 and 18 each comprise holding capacitors 21, 25, two operational amplifiers 19/20 and 23/24, and reset transistors 22 and 26, wherein reset signals are entered for discharging held charges on the capacitors 21 and 25, respectively, thereby resetting the circuits.

FIG. 4 illustrates a circuit diagram of an embodiment of the spark position detecting means 11 in which the holding circuits amplify the current signals detected by the current detectors 8 and 9, or latch the detected current signals and then amplify the held signals to deliver a spark position signal according to the detected spark position. FIG. 4 further includes, in the form of a block diagram, the digital data arithmetic unit 12 for generating a spark discharge position signal. As an embodiment of the detecting means 11, FIG. 4 illustrates, as an example, the use of a differential amplifier 27 as the amplifier preferred in the case wherein current detection is done at both the upper and lower electrical feed members, this being the preferred mode of carrying out the invention. In the differential amplifier 27, operation amplifiers 28 and 29 receive upper and lower detected current signals $I_{UP}$ and $I_{DW}$, respectively, and the outputs of the amplifiers 28 and 29 are input to a differential amplifier 30 and amplified after regulating the difference ($I_{UP}-I_{DW}$) between the detected current signals [see FIG. 5(f)]. The difference signal is virtually zero when a spark discharge takes place at the midway position of the wire electrode 1, i.e., midway between the upper and lower feed members 3 and 4 and against the workpiece 2. In this case, a spark position signal VC is delivered. The arithmetic unit 12 receives the spark position signal VC and converts the signal to digital format by A/D conversion. Thus, the analog spark position signal corresponding to the difference between the detected current signals is output in digital form by converting the analog signal into digital form, e.g. into an eight-bit digital data PD. In this embodiment, the spark position signal VC is arranged so that the signal VD, regulated to the working conditions, is input to the arithmetic unit 12 through an amplifier circuit having an amplification factor which varies inversely with respect to certain machining condition parameters such as machining voltages or spark pulse width (time).

The amplifier circuit may comprise an operation amplifier 31 for inverted amplification of the signal VC, a transistor TR3 inserted in a feedback circuit of the amplifier 31 to convert and regulate the amplification factor, and an A/D converter 32 for supplying a signal to the transistor TR3 so that the amplification factor of the amplifier circuit varies inversely with respect to predetermined machining conditions such as the machining voltage or spark width. The gate signals supplied to the transistor TR3 are counted and an analog signal is output. The reason the amplifier circuit is so arranged is that with wire cut electrical discharge machines and the many electrical machining parameters involved, variation in the possible current amplitude, which is set or is a consequence of the parameter setting, depends to a large extent on the set or desired voltage, spark pulse width and/or time. The result is that the waveform of the spark current will be generally triangular and as a rule the spark current will not rise to or exceed the predetermined value under the voltage and spark width settings usually set as machining conditions. Therefore, as described in connection with FIG. 5, by differentially amplifying the difference between the above detected current signals ($I_{UP}-I_{DW}$) with a spark position detecting means 11, without more, it may not be possible to distinguish between detected spark positions for different voltage or spark width settings.

Figure 5:
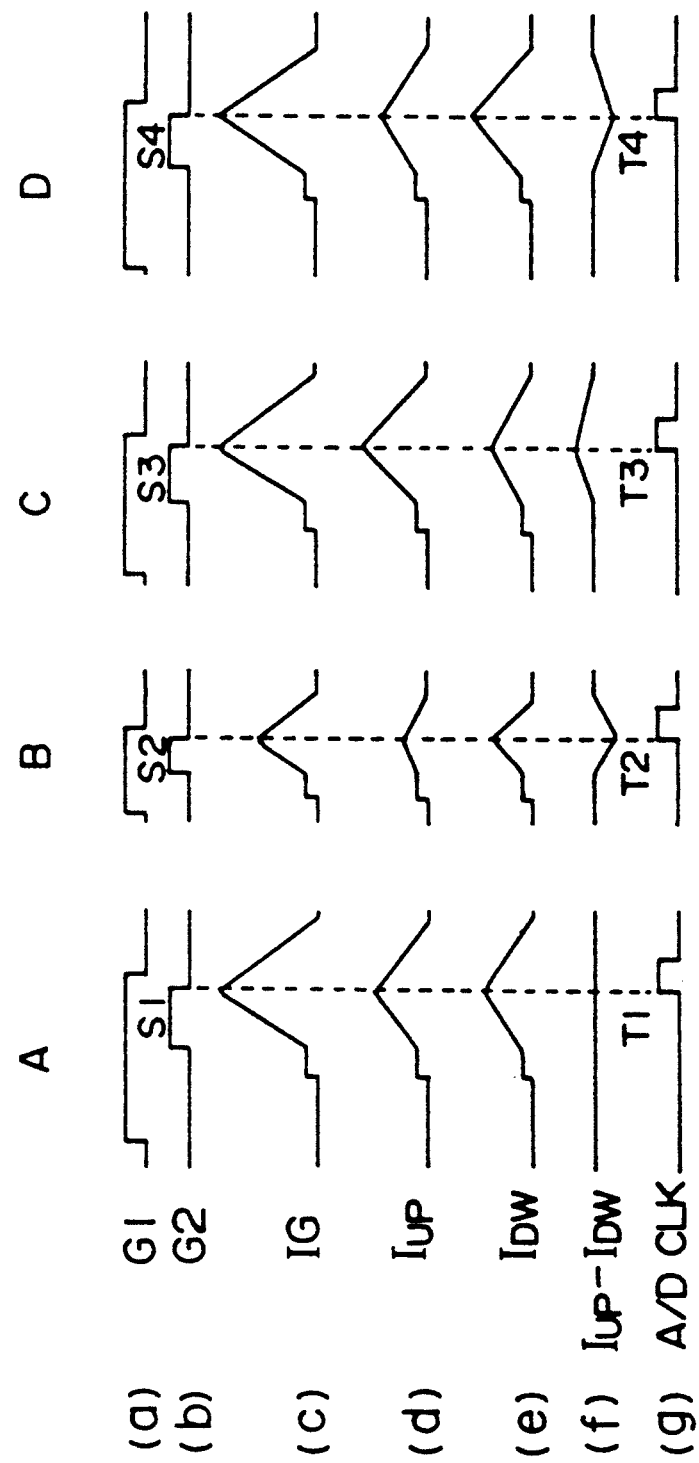
FIG. 5 is an input/output voltage and current waveform and timing chart for individual signals from the circuits of FIGS. 1 through 4; and columns A, B, C and D represent cases where a gate signal G2 differs in width as well as other differing discharge conditions.
Figure 6:
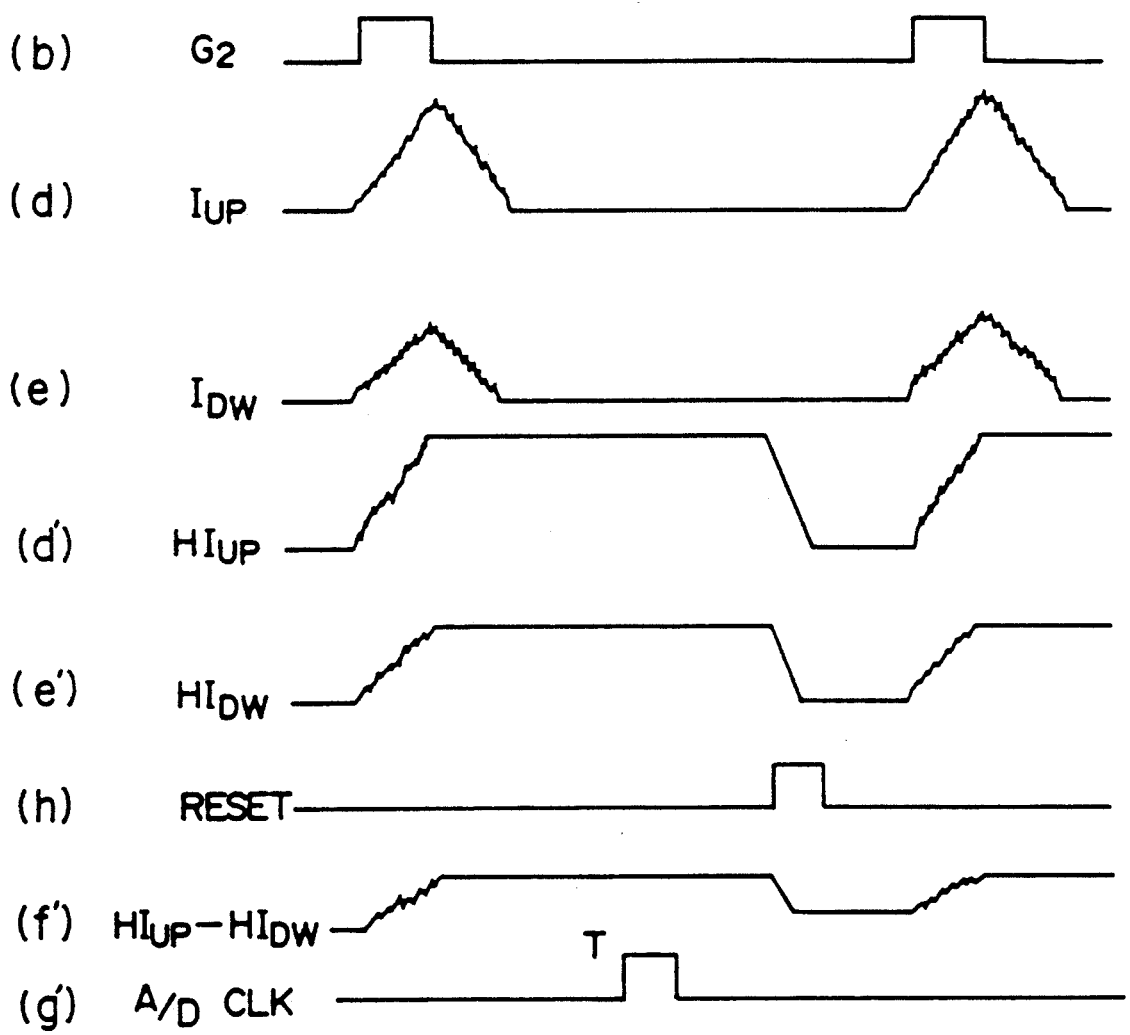
FIG. 6 is a waveform and timing chart similar to that shown in FIG. 5, illustrating the case wherein the peak holding circuit is used.

FIGS. 5 and 6 are charts illustrating signals such as input/output voltages, current waveforms and timing signals for individual blocks of the block diagrams and circuits of FIGS. 1-4. FIG. 5 illustrates waveforms present in the embodiment where the holding circuit 10 is not used, while FIG. 6 shows waveforms present in the embodiment where peak holding circuits 17 and 18 in FIG. 3 are used as the holding circuit 10.

FIG. 5 columns A, B, C and D illustrate different cases of the voltage or sparking pulse gate signal. In columns A, C and D the gate signals, G2, row (b), have the same pulse width; i.e. for columns A, C and D (S1=S3=S4). Column A represents the case where the current difference signal, row (f) ($I_{UP}-I_{DW}$)=0.

Column C represents the case where the current difference signal results in a positive value. Column D represents the case wherein the current difference signal results in a negative value. Column B represents the case where the gate signal, G2, row (b), is less than S1 (=S3=S4). In other words, the width of the machining pulse is narrow, such as may be the case where conditions are set for higher precision machining.

In FIG. 5 the signal G1 of row (a) illustrates the gate signal for switching element TR1; signal G2 of row (b) illustrates the gate signal for the switching element TR2; the signal IG of row (c) illustrates the waveform of the spark current ($I_{UP}+I_{DW}$); signal $I_{UP}$ of row (d) illustrates the upper detected current signal flowing from the spark point to the workpiece 2 through the wire electrode 1 from the upper electrical feed member 3 that is detected by the upper current detector 8; signal $I_{DW}$ of row (e) illustrates the lower detected current signal; current difference signal $I_{UP}-I_{DW}$, row (f), illustrates the difference between said upper and lower detected signals; and signal A/DCLK, row (g), illustrates the timing pulse generated simultaneously with the termination or turning off of the gate signal G2. The pulse A/D CLK enables the digital data arithmetic unit 12 to perform the arithmetic operation of converting the incoming signal VD into digital data.

Columns A, C and D illustrate the case where machining is carried out under conditions where the same value is set for the duration of the machining voltage pulse or, in other words, the width of the spark pulse. The spark of column A is taken to be a spark discharge fired at the workpieces from a location on the wire electrode midway between the above-noted feed members 3 and 4 by the absence of any detection signal, i.e., row (f) ($I_{UP}-I_{DW}$). In reality, the possibility that the location is slightly above or below the midpoint, as against right at the midpoint, is strong as the signal $I_{UP}-I_{DW}$ has been regulated by the variable resistance VR of the difference amplifier 27. The sparks represented by columns C and D occur, respectively, above and below the midpoint. The spark positions can be checked by monitoring the digital data PD, as converted and computed by the arithmetic unit 12.

Figure 7:
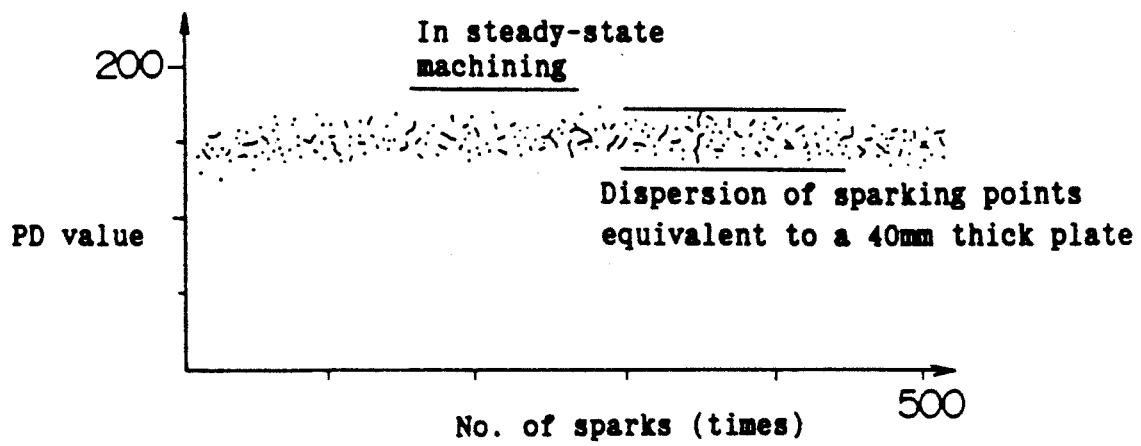
FIG. 7 is a time chart plotting digital data values PD indicative of spark discharge position distribution under stable machining operations over time.
Figure 8:
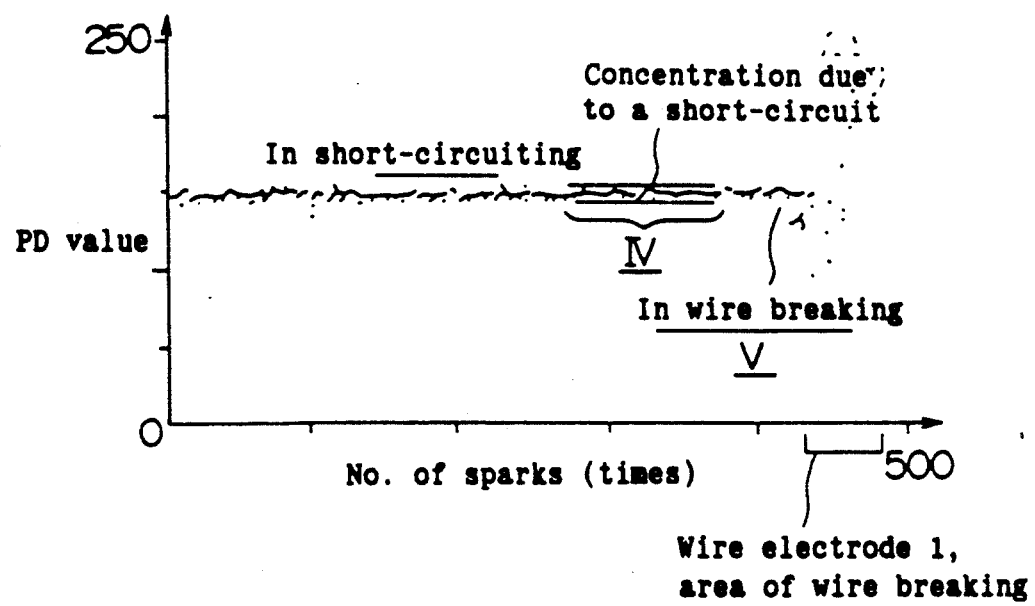
FIG. 8 is a time chart plotting digital data values indicative of a spark discharge position distribution under conditions wherein short-circuiting or a spark discharge position concentration is occurring over time.

FIGS. 7 and 8 are charts which illustrate characteristic digital data PD for spark discharge positions output every time a spark discharge pulse is created as described above, or based on the spark discharge pulses sampled as necessary, for example, one pulse out of every three pulses. In either case, in FIG. 7 it is assumed that a 40 mm thick workpiece 2 is being machined. In the case of FIG. 7, the data can be classified as indicating steady-state machining. In FIG. 8, the data can be classified as machining under non-steady-state conditions, such as short circuiting, concentrated spark positions and wire breaking. The graph charts graduated digital data values (A/D converted spark discharge position signals PD) from the arithmetic unit 12 vertically against a number of sparks (=time) horizontally. As will be clear from the chart, during steady machining (FIG. 7), there is almost no concentration of sparks, and over the passage of machining time, the plotted points of spark positions are random and almost evenly scattered and distributed over the whole thickness of the workpiece 2 in the axial direction of the wire electrode 1. In the case of a short circuit, or just before breaking of the wire electrode 1, or where the sparks tend to concentrate at a location (FIG. 8), the plotted points of spark positions appear to be concentrated at a location of a short circuit point along the plate thickness (40 mm) of the workpiece 2. Moreover, despite the existence of a partial scattering to the perimeter, the plotted points are linearly intermittent along the time base. If this spark distribution continues, a point V where the wire electrode 1 breaks, will result. In advance of that breakage, a concentrated linearization of plotted points as seen in part IV of FIG. 8, may appear. When the wire electrode 1 has broken, its free ends will come in contact with the workpiece 2 and other electrically conductive structures and will strike sparks. Thus, as illustrated in FIG. 8, on wire breakage the position of spark points may extend in the axial direction of the wire electrode 1 beyond the plate thickness of the workpiece 2. According to the invention, by providing an arrangement whereby the spark discharge positions can be detected and distinguished with high accuracy, the ability to detect and anticipate a break of the wire electrode 1 can also be realized.

FIG. 6 is a waveform chart illustrating the case where the peak holding circuit (FIG. 3) is used as the holding circuit 10 for detecting current signals between the current detectors 8 and 9 and the spark discharge detecting means 11, as described above. In FIG. 6, $HI_{UP}$, row (d'), is a peak holding waveshape of the upper detected currents. Similarly, $HI_{DW}$, row (e'), is a lower peak holding waveshape. A signal equivalent to the peak value of detected current signals is held until the RESET signal 1, row (h), is delivered. The difference signal $HI_{UP}-HI_{DW}$ (f') is differentially amplified, and a time setting pulse T, row (g'), delayed with respect to the time of gate G2, as shown in FIG. 5, is delivered at the time the peak holding difference signal is amplified to allow the digital data arithmetic unit 12 to carry out is conversion operation to output the digital data PD. As described above, when, under predetermined machining conditions, the voltage or spark pulse width is set relatively wide (in duration) with respect to the amplitude of the spark current, and the amplitude of spark currents IG, row (c), of FIG. 5, increases to its predetermined maximum value by the end of the pulse width, there is of course no need to delay the set time of the pulse T as described above.

Further, with regard to obtaining the signal VD from the spark position signal VC, the signal VC in FIG. 4 is regulated by a variable gain inversion amplifier, consisting of the operational amplifier 31 and other components. For example, comparing the spark resulting from a short gate signal (e.g., column B of FIG. 5) and the spark resulting from a longer gate signal (e.g., column D of FIG. 5), the difference of detected current signals are nearly equal: column B($I_{UP}-I_{DW}$)=column D($I_{UP}-I_{DW}$). The signal VC is the signal amplified by the difference amplifier 27 of the spark position detecting means. When that signal is converted into the digital data PD by the arithmetic unit 12, the possibility of detecting sparks occurring at the same position is high. However, in response to the upper detected current signal, row (d), and lower detected current signal, row (e), of individual sparks, the ratio of upper ($I_{UP}$) to lower ($I_{DW}$) is about 1:2 for the spark in column B and about 2:3 for the spark in column D. In accordance with this data, these would be recognized as sparks in different positions; at approximately 67 percent and 60 percent, respectively, of the thickness of the workpiece 2, as measured from the workpiece bottom. Thus, there is provided an arrangement as described above, wherein the internal resistance of the transistor TR3 is controlled to obtain the amplified and regulated signal VD which is then converted into digital data indicative of spark positions.

Figure 9:
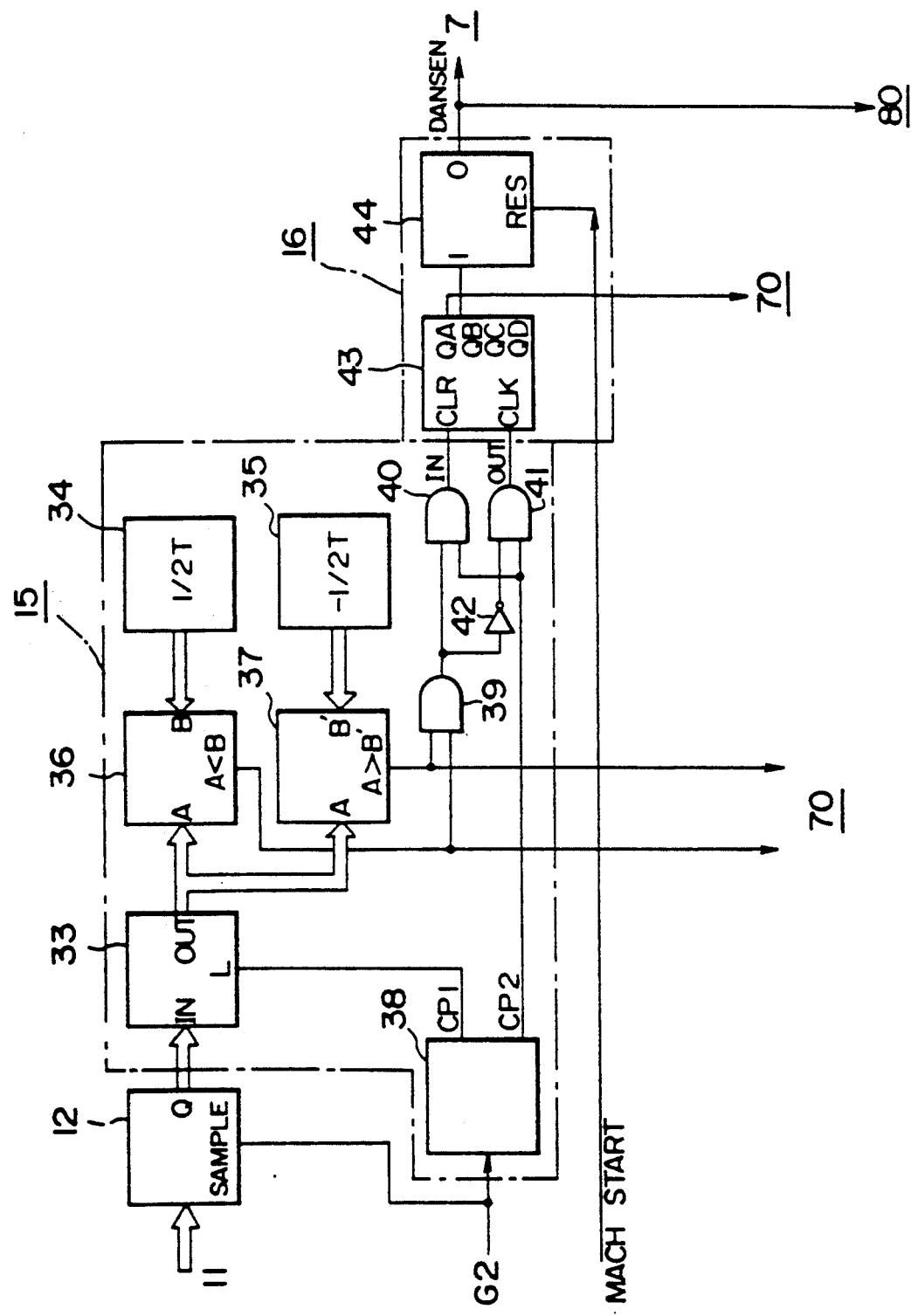
FIG. 9 is a block diagram representing the general arrangement and interconnective relationship of the inside/outside workpiece thickness spark position detection device wherein digital data relating to the detected spark position is used to ascertain wire electrode breakage in accordance with the frequency of detection of the outside spark position signal detection.

Next, as depicted in FIG. 9, we will describe the inside/outside workpiece thickness detector 15, which detects the spark position of each spark pulse or sampled spark pulse, and determines whether or not the spark discharge point is within the thickness of the workpiece 2. In other words, the detector 15 determines whether or not a spark discharge has occurred between the electrode and an object other than the workpiece 2. We will also describe the wire breakage discrimination device 16 which generates a wire electrode break signal (DANSEN) to stop the operation of the wire cut discharge machining device or at least the machining operation. The wire electrode break signal (DANSEN) is output when a determination is made based on the signals from the spark discharge position detection device 15 that the wire electrode has broken. Specifically, when the detection signals are biased beyond a certain amount towards outside-the-workpiece thickness signals, or when the frequency of the outside-the-workpiece discharge position signals exceed that of the inside-the-workpiece discharge position signals by a predetermined value, or when an abnormal number of detection signals occurs, a wire electrode break signal will be output.

The inside/outside workpiece thickness detecting device 15 consists of the following: a latching circuit 33 which receives digital data corresponding to the spark discharge position output by said arithmetic unit 12; adjusters 34 and 35 which preset the digital data value and upper and lower limit value for the spark discharge position, respectively, of the upper half thickness $+\frac{1}{2}T$ and lower half thickness $-\frac{1}{2}T$, measured from the center, e.g., usually one-half of the thickness T of workpiece 2; spark position digital data (A) of the most recent spark pulse which is output from latching circuit 33; first and second upper/lower limit comparators 36 and 37 which compare data (A) with the upper/lower limit thickness digital data values (B) and (B') which respectively correspond to the upper and lower positions from the normal center position of workpiece 2 as preset by adjusters 34 and 35, respectively; a delay timing pulse generation device 38 which outputs a latching signal, in the form of timing signal CP1, to the latching circuit 33 simultaneously with the closing of the gate signal G2 or the start of the timing pulse T, and which outputs a delay timing pulse CP2, slightly after the timing pulse CP1 is output, in order to generate an outside/inside workpiece thickness detection signal indicative of whether the spark position of the most recently generated spark pulse is inside or outside the thickness of the workpiece A logic circuit receives signals indicative of comparison results by comparators 36 and 37, makes a logical determination upon the generation of delay timing pulse CP2, and outputs an inside workpiece thickness detection signal IN if the spark discharge position is inside the upper/lower limit of the thickness of workpiece 2 being machined, and a thickness outside detection signal OUT if the spark discharge position is outside of the thickness of the workpiece 2. The detector 15 includes a logic circuit incorporating three AND gates 39, 40 and 41, and one invertor circuit 12.

A broken wire electrode discrimination device 16 including a counter 43 is arranged so that if the detection signal OUT is generated, it will be input to count terminal CLK to be integrally counted, whereas if the detection signal IN is generated, it will be input to reset terminal CLR to reset the integrally counted number. The discrimination device utilizes four output terminals Q (A–D), and in this example, output terminal QA outputs a wear check starting signal to electrical feed member wear detection device 70 upon input of one thickness outside detection signal OUT, and output terminal QB outputs a signal when the count of thickness outside detection signal OUT reaches a set number (which number is equal to or greater than two), for example a count of ten. If a signal is output from terminal QB, flipflop 44 is set, wire electrode breakage signal DANSEN is output to wire spark machining control device 7, and wire spark machining operation is stopped. Since there was a breakage, or at least a determination of a breakage, the breakage signal DANSEN is also output to feed member wear detection device 80 as a signal to halt or terminate wear detection. Also, output signals which are the result of comparisons made by comparators 36 and 37, and the signal from output terminal QA of counter 43 are input to the electrical feed member wear detection device 70 (described below) in order to determine which of the feed member(s) experienced the wear. After the output of wire electrode breakage signal DANSEN, the wire electrode is restored by joining or replacing the broken wire electrode, automatically or manually, and other necessary changes and adjustments are made to the machining conditions. Thereafter, machining can be resumed with the input of machining resume signal MACHSTART to reset terminal RES of flipflop 44.

The numerical values, such as the above described digital data value A corresponding to the spark discharge position, which are output by arithmetic unit 12 and latched by the latching circuit, and the digital data values B and B' which are preset in accordance to the upper half thickness $+\frac{1}{2}T$ and lower half thickness $-\frac{1}{2}T$ of the workpiece 2, are settings where machining conditions are not particularly abnormal, excluding situations where for example, the power transfer from the upper and lower feed members 3 and 4 to the wire electrode is malfunctioning. In the case where the apportioned ratio of the flow of spark feed current from the upper and lower feed members to the wire electrode 1 is 1:0, or even in the case where an uneven feed ratio of 5:1 is detected, this information is converted to spark position digital data A indicative of an uneven electric supply, concentrated at either the upper or lower feed members and beyond the thickness of the workpiece. Data A is compared to preset data B and B' and an outside thickness detection signal OUT is output. Incidentally, even under such conditions, machining may proceed normally, assuming normal machining conditions have been appropriately selected, set and adjusted. The value of digital data PD of the spark discharge position, output by digital data arithmetic unit 12 per every spark pulse, is input to terminal A of comparators 36 and 37 respectively, and is compared to the data values for the upper and lower limit values, B and B', respectively, which represent the upper and lower thickness from the center of the thickness of workpiece 2. As a matter of course, the above value input to terminal A will be less than the upper limit value (A<B) and higher than the lower limit value (A>B'). Since each of the comparators 36 and 37 will respectively operate according to its set conditions, each will output a signal to AND gate 39, which will in turn output a signal to terminal CLR of counter 43 from AND gate 40 when the delay timing pulse CP2 is output from pulse generation circuit 38 after a slight delay from the latching of above compared data A. If an integrated (non-zero) count of the signals input to terminal CLK is stored in the counter 43, that count will be reset to zero. If no integrated count is stored in the counter 43, the count will be held at zero and no signals will be output by the counter 43. The above described detection and determination is repeated in succession for essentially all of the spark pulses or for a preset sampling of spark pulses which occur during normal wire cut electrical discharge machining. When the outside/inside workpiece thickness detection device 15 for the spark discharge position outputs only inside thickness detection signal IN, machining will proceed under conditions illustrated by FIG. 7 with no output from the wire electrode breakage detection device 16.

Even when machining under normal settings as described above, various machining phenomenon may occur in situations where the machining is extended for a long time, where problems or changes in conditions arise in some control system, or where inappropriate conditions exist within the preset machining conditions or its balance and the like. FIG. 8 shows one example of time (abscissa) distributed condition of digital data PD representing spark positions under unusual conditions where concentrated sparks or a short circuit condition is occurring randomly and frequently in the machining gap. The length of the horizontal axis is within a time frame of about 5 ms. FIG. 8 illustrates a serious condition where the digital data PD and its plotted points for each spark pulse suggest that spark concentration and short circuit have been frequently occurring in the machining gap from the beginning and an immediate breakage of the wire electrode would not be surprising. Wire cut electrical discharge machines equipped with the present invention will strive to achieve and maintain highly efficient machining performance by preventing wire electrode breakage from occurring through the correction of spark concentrations and short circuits. Adjustments will be made to machining conditions, for example, by varying control of the mean working current to half or less (including a temporary zero setting) by controlling the OFF time between voltage pulses, controlling the machining feed e.g. reducing and stopping the feed rate or backward feeding, or varying control of the working fluid supply, particularly the flushing conditions and flushing situation. One or more of these controls will be used immediately upon a detection of random, intermittent and frequent spark concentration or short circuit, as illustrated in FIG. 8, or upon a detection, by various detection means and circuits, of precursors to unsteady state machining conditions.

While a wire electrode break accident seldom occurs, when it does happen, it is necessary to have prompt detection to activate various corrective devices or safeguards, such as those used to stop the machine. According to the present invention, the spark discharge position of a sparking pulse, generated by the impression of a machining pulse between the wire electrode 1 and the workpiece 2 and in between a pair of feed members 3 and 4 is accurately detected, converted into digital data PD=A with the arithmetic unit 12, and output to the inside/outside workpiece thickness detection device 15.

This data is then compared with the digital data B, which is the upper limiting value corresponding to the upper side of the thickness of workpiece set in the comparator 36 of detector 15, and the digital data B', which is the lower limiting value corresponding to the lower side of the thickness of workpiece set in comparator 37. A signal is output after logically discriminating whether the spark discharge position of the spark pulse is within the thickness (IN) of the workpiece by satisfying the condition $B>A>B'$ or whether it is outside the thickness (OUT) and by satisfying the condition $A>B$ and/or $A<B'$. If the detector 15 outputs an outside thickness signal OUT, that OUT signal will be counted by counter 43 of the wire electrode breakage discrimination device 16. The count of thickness outside signal, OUT, by the counter 43 will continue until an inside thickness signal IN is output by detector 15, A signal is output by the counter 43 when a set count number, for example, a ten count, is integrally counted. Further, flipflop 44 is set and wire electrode break signal DANSEN is delivered to the machining control device 7 to enable a control operation such as clamping or at least a temporary stopping of the travel and movement of the wire electrode, using, for example, the machining feed drive circuit 7B, or stopping, at least temporarily, the delivery of machining pulses from the machining power supply 74 controlling the working fluid supplying circuit 7C and the like.

With this embodiment, the time from when the first OUT signal is generated to the time when the wire electrode break signal DANSEN is generated and a control operation commenced, will be considerably shorter than about 100 $\mu$s. For example, wire break detection, control and the like based on spark position detection, takes place after pause time control between voltage pulses (where machining pulse OFF time is increased by a factor of 10), can be performed in a short time e.g. at the longest about 1 ms or thereabouts. Therefore, by monitoring the position detection data occurring at or about the time of wire electrode breakage a break signal (DANSEN) can be generated very soon after the digital data (PD) representative of spark discharge positions, displays a characteristic such as area V of FIG. 8, which represents a vertical and random scattering of discharges outside of the workpiece thickness, indicative of the wire electrode breakage.

It is known that at the time of wire electrode breakage, the broken end segments may move randomly about and come into contact with workpiece 2, adjacent machine areas and other areas—such as the liquid supply guide block, in which the wire electrode is inserted, preferably in a coaxial manner with respect to a nozzle for jetting the working fluid. The guide block incorporates guide members to position the wire electrode, as well as other parts inside the liquid supply and the guide block structure which are combined and integrated into the above guide blocks portion. It is a result of intermittent contact with portions of this structure which may result in short circuiting, spark discharges and the like. This is because on wire breakage, the portion of the wire electrode which is used for machining, i.e., the portion of between the upper and lower liquid supply and guide blocks, is slack, and the space between the wire electrode and the feed members is such that random contact and broken contact, in comparison to the steady sliding contact condition prior to the breakage, may occur. Under such conditions spark positions, determined to be outside the thickness of the workpiece, may result. Moreover, spark position data may be generated which is actually indicative of opposing ends of the broken wire electrode contacting each other or the wire electrode contacting an associated portion of the electrical feed member.

Over time, even normal machining may cause a wear deformity to the upper and/or lower feed members 3 and 4. In such a case, a large portion of the discharge current from a spark pulse generated in the machining area may flow from the side where the feed member has not deformed from wear, and the digital data representative of such a spark position may be detected and erroneously determined to be outside the workpiece thickness. Recognition of this condition has led to the next aspect of the present invention described below, which provides a wear detection system for diagnosing electrical feed member wear.

Figure 10:
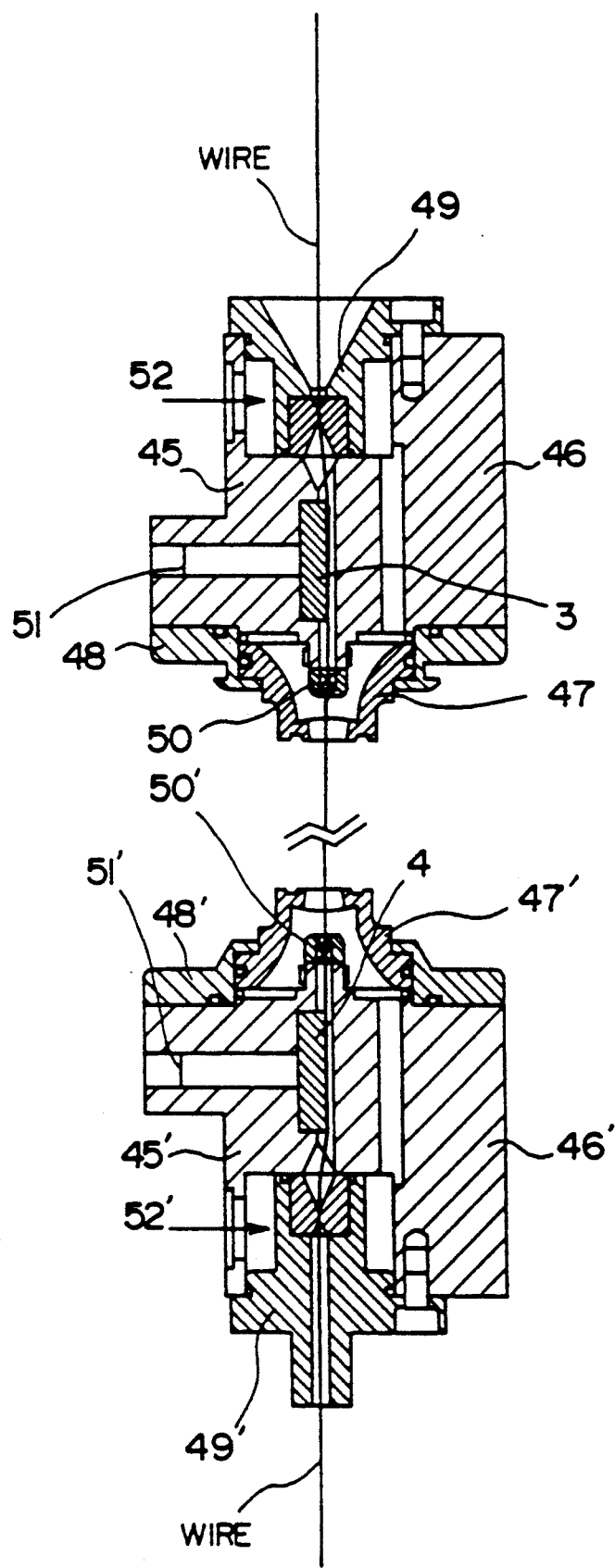
FIG. 10 is a longitudinal sectional view of one embodiment of an upper, and lower water supply and guide block incorporating electrical feed members.

FIG. 10 is a longitudinal section diagram illustrating an example of an upper and lower liquid supply and guide block which are respectively attached to the upper and lower arms of the machine or to a machine head. Reference numbers 45 and 45' denote upper and lower guide blocks which include an insertion hole along the axis of travel of the machining portion of the wire electrode 1. Reference numerals 46 and 46, denote upper and lower liquid supply blocks which, together with 45 and 45', form, as a single unit, the passageway for the working fluid. Reference numerals 47 and 47' denote upper and lower nozzles, and reference numerals 48 and 48', respectively, denote upper and lower nozzle holders. Reference numerals 49 and 49' denote lead-in and lead-out members, respectively, each including a draining guide into which the wire electrode is inserted, and which form inlet and outlet passages, respectively, for the wire electrode. Reference numerals 50 and 50' denote die-shaped upper and lower positioning guide members, respectively, arranged at the end parts of the insertion holes in the upper and lower guide blocks 45 and 45'. Reference numerals 3 and 4 denote upper and lower feed members, respectively, arranged to face said insertion holes. Reference numerals 51 and 51', respectively, denote upper and lower current carrying members which adjust the degree of projection of the feed members 3 and 4, into the insertion holes, and which can also be jointly used as a brush to connect the feed members 3 and 4 to one terminal of the machining power supply 7A, usually, the minus terminal. Reference numerals 52 and 52' respectively denote working fluid inlet ports to the upper and lower liquid supply and guide blocks. In addition, the feed members 3 and 4 are formed from very hard and wear resistant materials having good electrical conductivity characteristics, usually formed by pressuring, compacting and sintering powder particles of tungsten carbide using cobalt or the like as a binder.

Geometrically, the electrical feed members 3 and 4 may be pin shaped members that are cylindrical or the like, or plate or block-shaped members that may have triangular or square cross sections or the like. However, in the illustrated embodiment, the feed members 3 and 4 have a generally semi-cylindrical shape to allow their top face side (i.e., the side opposite the members 51 and 52') to be oriented towards the insertion hole so that the face of the feed members intersect the space at a right angle, as illustrated in FIG. 10, so that the contact length between wire electrode 1 and feed members 3 and 4 can be increased, and contact portion with wire electrode 1 can be changed by varying and adjusting the position of the feed member 3 and 4 to adjust for appropriate friction or the like.

Figure 11:
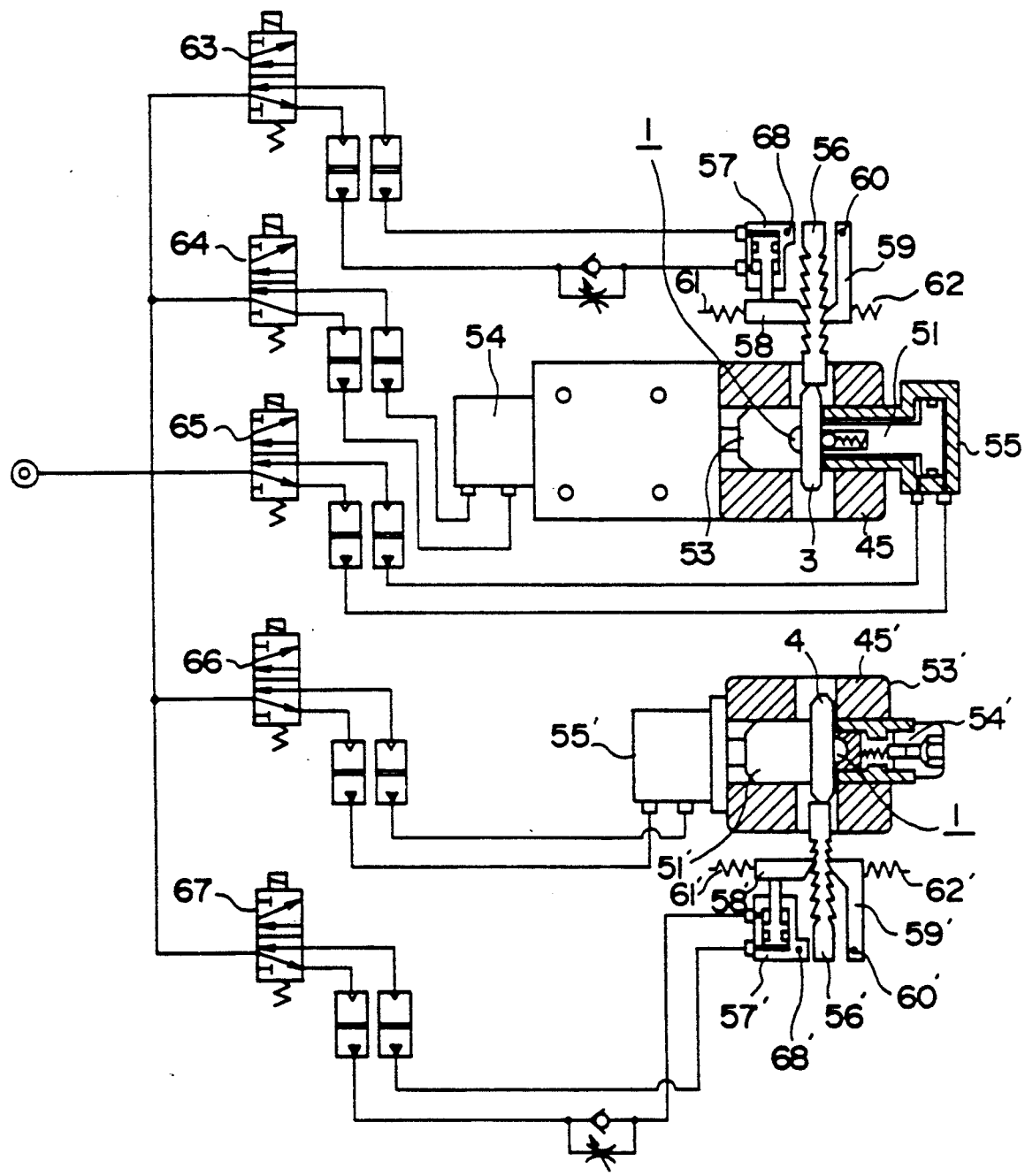
FIG. 11 is a cross sectional view of an arrangement for moving the upper and lower feed members illustrating a specific example of the associated driving mechanism.

FIG. 11 is a cross sectional diagram of a section perpendicular to the axis of wire electrode 1, which illustrates one example of a structure for positioning the upper and lower feed members 3 and 4 in the guide block sections 45 and 45'. In this figure, reference numerals 53 and 53' denote pressure members for positioning and receiving the feed members 3 and 4. In the illustrated embodiment, the upper member 53 has a cylinder 54 driving system, and the lower pressure member 53' has a screw and spring driving mechanism 54' to set the receiving positions for the feed members 3 and 4. During an automatic insertion or joining operation of wire electrode 1, the pressure member 53 is automatically controlled by the cylinder 54, which is moved backward. Reference numerals 55 and 55' are upper and lower energy on-off cylinders which maintain a set sliding contact condition with wire electrode 1, using energy members 51 and 51' as pistons to drive and adjust the feed members 3 and 4. Reference numerals 56 and 56', respectively, denote feed actuating bars which are oriented in an opposing contact relationship with the feed members 3 and 4 so that each upper and lower feed members 3 and 4 can be driven in the axial direction and transverse directions with respect to the wire electrode 1. On the surface of the activating bars, ratchet gear teeth are formed at a predetermined pitch, for step feeding in the axial direction. Feeding pawls 58 and 58' are actuated by feeding cylinders 57 and 57' and backward stopper pawls 59 and 59' are engaged. In FIG. 11, reference numerals 68/68' and 60/60' denote swinging fulcrums for the feed cylinders 57 and 57' and backward stopper pawls 59 and 59' respectively, and reference numerals 61/61' and 62/62' denote compression springs for each. In addition, reference numerals 63, 64, 65, 66 and 67 denote directional control valves for the cylinders 57, 54, 55, 55' and 57', respectively.

In the illustrated situation, for example, when it becomes necessary to move or change the portion of a feed member which contacts the wire electrode 1 to a new surface area because wear is detected in either of the upper or lower feed members 3 and 4, activating signals are input to valves 63 and 67 via a feed member driving device 7D from wire spark discharge control device 7. Valves 63 and 67 are switched or shuttled to a reverse situation from the position illustrated in FIG. 11, and cylinders 57 and 57' are activated. In the illustration, if the pawls 58 and 58' are extended, the backward stopper pawls 59 and 59' rotate about fulcrums 60 and 60', and after climbing over the crest of the ratchet, drops to the bottom of the next gear tooth and is held there by springs 62 and 62'. Further, with the switching of valves 63 and 67, feed pawls 58 and 58' allow cylinders 57 and 57' to rotate about the fulcrums 68 and 68', respectively, and after climbing over the crest of the ratchet, drops down to the bottom of the next gear tooth. The system is then prepared for the next feed drive of the actuating bars 56 and 56'. The diameter of a typical wire electrode 1 used for wire discharge machining is about 0.2 mm$\phi$ or thereabouts, and scratches and the like on the feed members 3 and 4 will result from damage and wear caused by the sliding contact between the wire electrode and feed member. This can be compensated for by moving the feed members 3 and 4, using the feed drive of the actuating bars 56 and 56', about 1 mm at a time or thereabouts to renew the sliding contract surface portion. As provided by the device illustrated in FIG. 11, shifting of the feed member can be performed about 10 times or thereabouts to compensate for feed member wear.

Figure 12:
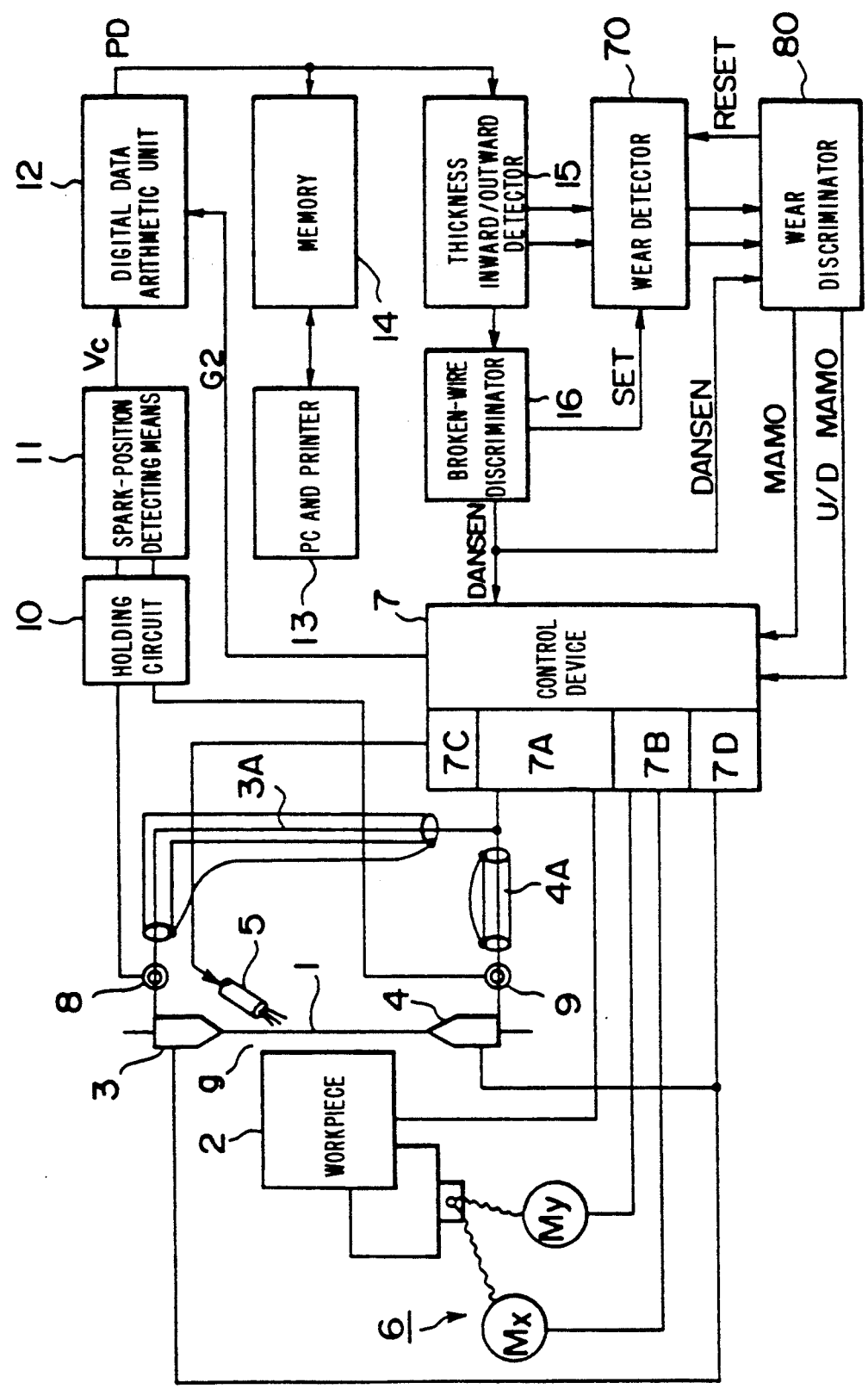
FIG. 12 is a block diagram illustrating the general arrangement of one embodiment for implementing electrical feed member wear detection according to a second embodiment of the present invention.

FIG. 12 is a block diagram of the general arrangement of an illustrative embodiment of a second aspect of this invention which incorporates an arrangement for discriminating when a wire electrode break determination, made on the basis of spark position detection wherein the spark position is determined to be outside the thickness of the workpiece by the inside/outside detection device 15, is in fact caused by some other reason, e.g., wear of a feed member. Also incorporated in the embodiment of FIG. 12 is an arrangement for determining and discriminating among other causes for spark position data to be outside the thickness of the workpiece, specifically whether the cause is feed member wear.

In explaining the embodiment of this second inventive aspect, as opposed to the first inventive aspect and its illustrations in FIG. 1, when the first outside thickness detection signal OUT is output, after an inside thickness detection signal IN is output by the detection device 15, the output from terminal QA of counter 43 of the wire electrode breakage detection device 16 (FIG. 9), and the output signals indicative of the comparison results from upper and lower limit comparators 36 and 37 of the inside/outside thickness detection device 15, are input to the feed member wear detection device 70. The feed member wear detection device 70 generates a wear detection signal MA and an upper and lower wear discrimination signal U/D MAMO. If after outside thickness detection signal OUT is generated, the wire electrode breakage detection device 16 does not output wire electrode breakage detection signal DANSEN within a set amount of time, a feed member wear detection signal MAMO and the upper and lower wear detection signal U/D MAMO is generated. These detection signals are input to the machining control device 7 to display, notify, and if necessary, output signals to the feed member drive device 7D. As explained above with regard to FIG. 11, the drive device 7D is operable to more feed members 3 and 4 a very small distance so that the surface portion of said feed members 3 and 4, which come in sliding contact with wire electrode 1, are renewed.

Figure 13:
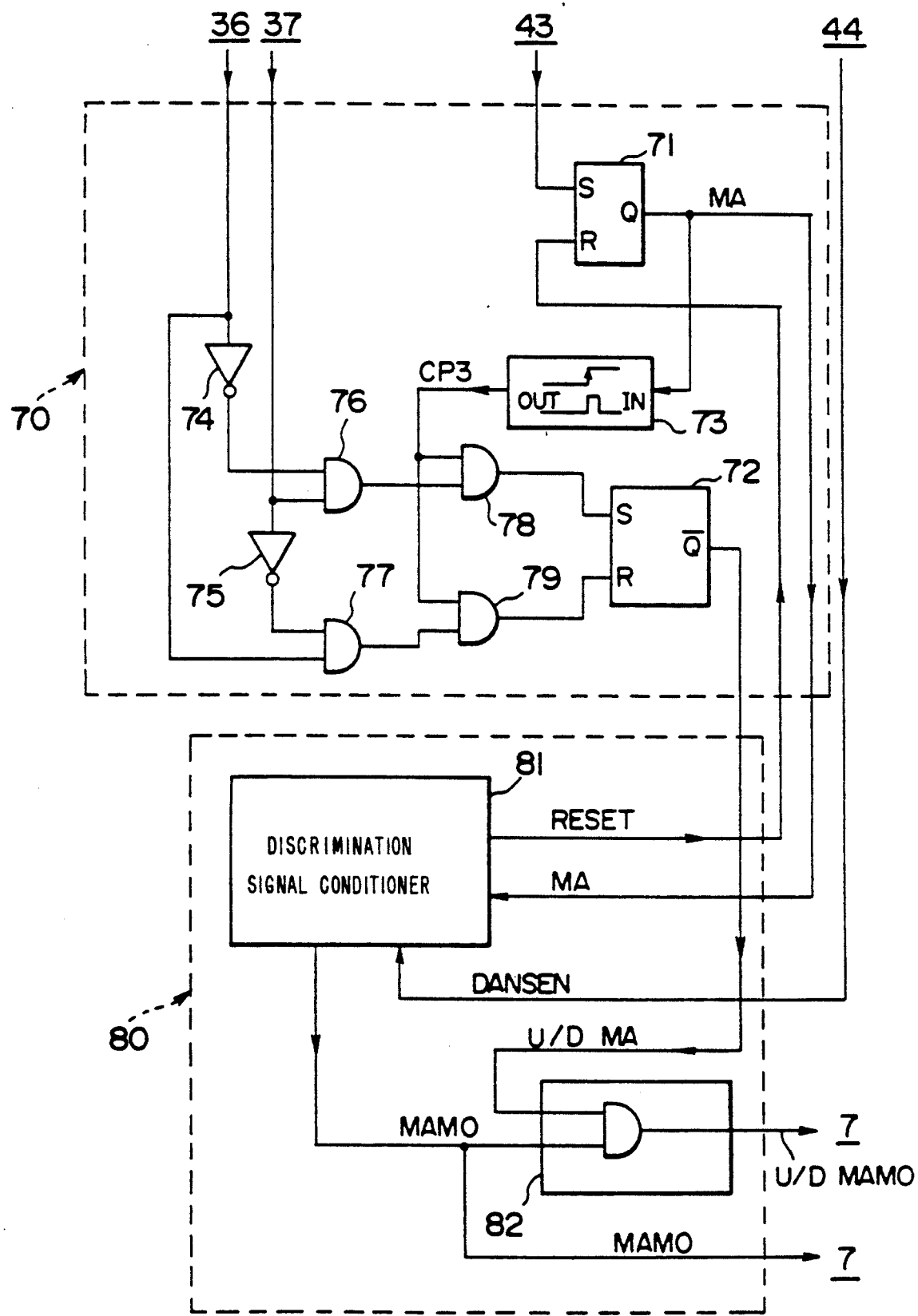
FIG. 13 is a block diagram illustrating an example of a circuit for wear detection and wear discrimination.

FIG. 13 is a block diagram which illustrates the details of the feed member wear detection device 70 and wear discrimination device 80. The wear detection device 70 consists of two RS flipflop circuits 71 and 72, a one shot pulse circuit 73, two invertor circuit 74 and 75, and four AND gate 76, 77, 78 and 79. Wear discriminating device 80 consists of a signal conditioning device 81 relating to feed member wear discrimination, and an upper and lower wear discrimination device 82.

The detection of wear of feed members 3 and 4 is done after the inside/outside thickness detection device 15 (FIG. 9) delivers a digital data value A relating to a detected spark position wherein either the comparator 36 determines that the data value A is equal to or greater than the upper limiting data B of the preset thickness, or comparator 37 determines that the data A value is equal to or less than the lower limiting data B' of the preset thickness. As opposed to a situation where a signal is output by one of the comparators 36 and 37, if no signal is output from either, the AND gate 39 does not output a signal. Then, when the delay timing pulse CP2 is output at its proper time from the pulse circuit 38, the AND gate 41 outputs an outside thickness detection signal OUT. The signal OUT is counted by counter 43 of discriminator 16. Counter 43 outputs a signal from terminal QA to flipflop 71 of the wear detection device 70. In turn, a wear detection signal MA is output from terminal Q of the RS flipflop 71 to the signal conditioning device 81 of the wear discrimination device 80 and to the one shot pulse generating device 73. Thus, the one shot pulse generating device 73 outputs a single pulse signal CP3 to AND gates 78 and 79 in response to the initial input of a wear detection signal MA. If the digital data corresponding to the detected position of the spark discharge pulse is equal to or greater than the upper thickness limit data B preset in comparator 36, and at the same time equal to or greater than the lower limit data B' of the comparator 37, then a signal equal to or greater than the upper limit is output from AND gate 76. Flipflop 72 is set when AND gate 78 outputs an upper and lower wear (or lower side wear) signal along with the pulse signal CP3. In contrast to the above, when the digital data A is equal to or less than the lower thickness limit data B' which is preset in comparator 37, and the data A is equal to or less than upper limit data B of comparator 36, then the AND gate 77 outputs a signal equal to or lower than the lower limit, and along with pulse signal CP3, upper and lower wear (of upper side) signal is output from AND gate 79, and the flip flop 72 is reset.

Further, after the wear detection signal MA is output by the flipflop 71 of the wear detection device 70 to the wear discriminator 80, the wire breakage discrimination signal DANSEN from wire electrode breakage discrimination device 16 is also input to the wear discriminator 80. Since the signal DANSEN indicates a wire electrode breakage, no discrimination signal relating to wear of feed members is produced, and a reset signal is output to RS flipflop 71 of the wear detection device 70, at which time wear detection operation is immediately terminated and reset. However, if, after the output of wear detection signal MA from flipflop 71, no wire breakage discrimination signal DANSEN is generated for a preset time period (preferably a few ms or thereabouts), the signal conditioning device 81 will discriminate that the earlier input wear detection signal MA was based on wear detection of both or at least one of the feed members 3 and 4. Then, the device 81 will generate a wear discrimination signal MAMO, and will output the signal MAMO to the machining control device 7 and also to an upper and lower wear discrimination device 82. When the wear detection signal MA is generated as a result of the detection of upper and/or lower wear by wear detection device 70, it is also input to the R or S terminals of RS flipflop 72 via the AND gates 78 or 79 following if the conditions are met: $A>B'$ but not $A<B$ or $A<B$ but not $A>B$, respectively. Thereon, an U/D MAMO signal is output to the upper and lower wear discrimination device 82. In accordance with the wear discrimination signal MAMO, the upper and lower wear detection device 82 will output the upper and lower wear discriminating signal, U/D MAMO, indicative of wear on an upper or a lower feed member, to the control device 7 in the same manner as above. Further, the machining control device 7 may provide a warning and/or display of feed member wear, in accordance with at least one of the two signals output from feed member wear discrimination 80. Under certain settings, the feed member driving device 7D is operated, using either automatic control or manual control by operator or the like subsequent to confirming the display, and the sliding contact feed portion of the feed member relating to the wire electrode is changed or renewed. With respect to the renewed operation of the feed member, programs and the like with preset machining power supply and machining feed control may be used to carry out the appropriate control, for example, terminating machining operations at once and thereafter gradually resuming normal machining.

It is noted that detection of wear of feed members 3 and 4 and the upper and lower wear discrimination was performed under conditions where the workpiece thickness outside detection signal OUT, which caused the output from counter terminal QA, was not from contact energy or nearby spark discharges between the broken wire electrode ends and the like or between portions of wire electrode 1 which are outside the machining zone which may occur on the complete breakage of the wire electrode and subsequent contact with parts other than the workpiece 2. In this case, the signal OUT resulted from a defective sliding contact between upper feed member 3 and wire electrode 1, caused, for example, by an excessive wear deformity on the upper feed member 3. The current for the spark pulse was drawn solely for the lower feed member 4, and this caused detection and discrimination that the digital data corresponding to the spark position was deemed to be outside the workpiece thickness lower limit value. In this situation, it may be determined that a wear exists in a feed member, with such wear determined to have occurred in the upper feed member 3.

As illustrated above, according to the wire cut electrical discharge machining apparatus of the present invention, the position of the spark in the axial direction of the wire electrode resulting from a spark generating pulse can be detected as to whether it is inside or outside the thickness of the workpiece. When the number or the frequency of the sparks occurring outside the thickness reaches or exceeds a preset level, wire electrode breakage discrimination is performed. Detection and discrimination of wire electrode breakage can be accomplished quickly and accurately, thus avoiding the occurrence of malfunction or damage to the workpiece, working fluid nozzle, feeder and wire transport systems.

In addition, according to the wire cut electrical discharge machining apparatus of the present invention, when a spark pulse is generated outside the thickness of the workpiece, such pulse is detected and a logical discrimination is performed. Where it is not a wire electrode breakage accident, detection and discrimination for feeder member wear is performed, thereby allowing reliable detection of wear. Further, when wear discrimination of the wear is performed to discriminate between upper and lower feed member wear, it is now possible to provide for faster response and treatment, and thereby increase machining performance.

The foregoing description of a preferred embodiment of the various aspects of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A wire break detection system for a wire cut electrical-discharge machining (WC-EDM) apparatus, said apparatus including a renewable wire electrode moveable in its axial direction through a working zone of said apparatus wherein a workpiece to be machined may be positioned, said wire electrode being held under tension and in contact with upper and lower electrical feed members respectively disposed on opposite sides of said working zone, and wherein, during machining, said workpiece is spaced from the wire electrode in said working zone by a working gap across which machining pulses are impressed in order to produce spark discharges between said wire electrode and said workpiece, said detection system comprising:

at least one current detector for detecting the current flowing through at least one of said electrical feed members;

a spark position detecting means for amplifying the detected current value from said at least one current detector and generating a signal corresponding to the spark discharge position along the axial direction of the wire electrode;

a digital data arithmetic unit for converting the spark discharge position signals from said spark position detecting means into digital data;

means for setting upper and lower limit values of digital data corresponding to the locations of the upper and lower surfaces of a workpiece to be machined;

means for comparing the digital data representative of the spark position with said upper and lower limit values;

a spark position generating means for generating a signal indicative of a spark position, said spark position generating means being responsive to a spark position digital data value greater than said upper limit value or less than lower limit value, to generate a signal indicative of a spark discharge outside of said workpiece thickness; and a broken wire discrimination means, responsive to said signals indicative of the spark position being outside the thickness of the workpiece for generating a wire break signal.

2. The wire break detection system according to claim 1, wherein said WC-EDM further includes upper and lower wire guide members disposed respectively on opposite sides of said working zone, said wire guides being operable to define therebetween the axial position of said wire electrode as it passes through said working zone.

3. The wire break detection system according to claim 1, wherein said spark position detecting means is operable to generate a position signal for each spark discharge generated.

4. The wire break detection system according to claim 1, wherein said spark position detecting means is operable to generate a position signal for a predetermined sampling of spark discharges.

5. The wire break detection system according to claim 1, wherein said upper and lower limit values of digital data are set using the center of said workpiece as a reference point, the center of said workpiece being located essentially midway between said upper and lower limit values.

6. The wire break detection system according to claim 1, wherein said machining pulses are generated using a gate pulse signal, further comprising means for generating a timing pulse signal slightly delayed with respect to said gate pulse signal, and wherein said means for generating the signal indicative of a spark position outside of the workpiece is further responsive to said timing pulse signal to enable said position signal to be generated.

7. The wire break detection system according to claim 1, wherein said spark position detection means includes means for amplifying the detected current from said at least one current detector.

8. The wire break detection system according to claim 1, wherein said machining pulses are generated by means of a gate pulse signal, further comprising means for generating a timing signal, slightly delayed in time from the termination of said gate pulse signal, said timing signal being input to said digital data arithmetic unit for timing the conversion of said spark discharge position signal into said digital data.

9. The wire break detection system according to claim 8, wherein said spark position detecting means includes a means for amplifying the detected current from said at least one current detector, said amplifying means including means for varying the amplification factor in accordance with predetermined machining conditions.

10. The wire break detection system according to claim 1, wherein said at least one current detector comprises a pair of current detectors, one associated with each of said upper and lower electrical feed members.

11. The wire break detection system according to claim 10, wherein said machining pulses are generated by means of a gate pulse signal, further comprising a sampling and holding means for receiving the current signals from said current detectors and latching said current signals synchronously with said gate pulse signals.

12. The wire break detection system according to claim 11, wherein said spark position detection means includes means for amplifying the current signals from said current detectors.

13. The wire break detection system according to claim 11, wherein said sampling and holding means comprises a peak current holding circuit means for latching the maximum value of the detected current from each of said current detectors and for generating an output signal synchronously with the termination of said gate pulse signal.

14. The wire break detection system according to claim 13, wherein said sampling and holding means is operable for latching the maximum value of the detected current for each spark discharge.

15. The wire break detection system according to claim 13, wherein said sampling and holding means is operable for latching the maximum value of the detected current for a predetermined sampling of spark discharges.

16. The wire break detection system according to claim 13, wherein said peak holding circuit means comprises first and second peak holding circuits responsive to said upper and lower current detectors, respectively, and wherein spark position detection means include a difference amplifier operable for extracting a signal indicative of the difference between the peak current values held by peak holding circuits to thereby generate a spark position signal.

17. The wire break detection system according to claim 16, further comprising means for generating a timing signal slightly delayed in time with respect to the termination of said gate pulse signal, said timing signal being input to said digital data arithmetic unit for timing the conversion of said difference signal into said digital data.

18. The wire break detection system according to claim 17, further comprising an amplifier means for amplifying said difference signal, said amplifier means having means for varying the amplification factor thereof, whereby said spark position signal is amplified in accordance with predetermined working conditions.

19. The wire break detection system according to claim 1, wherein said spark position generating means is responsive to a spark position digital data value less than said upper limit value and greater than said lower limit value to generate a signal indicative of a spark discharge between said workpiece and wire electrode.

20. The wire break detection system according to claim 19, wherein said broken wire discrimination circuit comprises a counter for counting up the number of said signals indicative of a spark discharge outside the thickness of the workpiece for generating said wire break signal when said count reaches a predetermined value.

21. The wire break detection system according to claim 20, wherein said counter is operable, in response to a signal indicative of a spark discharge between wire electrode and workpiece, to reset said count to zero.

22. The wire break detection system according to claim 20, wherein said WC-EDM apparatus further comprises a control device for controlling said WC-EDM apparatus, and wherein said wire break signal, upon generation, is output to a control device for controlling said WC-EDM apparatus.

23. The wire break detection system according to claim 19, further comprising an electrical field member wear detecting means, responsive to the generation of said signal indicative of a spark discharge outside of the workpiece thickness after the generation of said signal indicative of a spark discharge between said wire electrode and said workpiece, to generate a signal indicative of wear of at least one of said upper and lower electrical feed members.

24. The wire break detection system according to claim 23, further comprising a wear discrimination means, responsive to said wear detecting means, to generate a feed member wear signal in response to a wear detection signal if no broken wire signal is generated by said broken wire discrimination means within a predetermined time after generation of said wear detection signal.

25. The wire break detection system according to claim 24, wherein said WC-EDM further comprises a display and said wear discrimination means is operable to drive said display to indicate said feed member wear status.

26. The wire break detection system according to claim 24, wherein during operation of said WC-EDM, contact between said upper and lower electrical feed members and said wire electrode is a sliding contact, and further comprising means, responsive to said wear detection signal, for adjusting the position of at least one of said electrical feed members relative to said wire electrode whereby a new site of sliding contact is established between said at least one electrical feed member and said wire electrode.

27. The wire break detection system according to claim 26, wherein said adjusting means comprises upper and lower activating members respectively positioned to contact said upper and lower electrical feed members and operable to be driven, in response to said wear detection signal, to thereby move its associated electrical feed member.

28. The wire break detection system according to claim 24, wherein said means for comparing is operable to generate a first signal if said spark position digital data is less than said lower limit value and a second signal of said spark position digital data is greater than upper limit value, and wherein said feed member wear detecting means comprises a logic circuit, responsive to said first and second signals for generating an up/down signal indicative of whether the wear signal is a result of wear of said upper electrical feed member, said lower electrical feed member, or both.

29. The wire break detection system according to claim 28, wherein said WC-EDM further comprises a display and said wear discrimination means is operable to drive said display to indicate said feed member wear status and which of said upper and lower feed members is worn.

30. The wire break detection system according to claim 28, wherein, during operation of said WC-EDM, the contact between said upper and lower electrical feed members and said wire electrode is a sliding contact, and further comprising means responsive to said up/down signal for selectively adjusting the position of said upper electrical feed member, said lower electrical feed member, or both, relative to the wire electrode whereby a new site of sliding contact is established between said selected upper electrical feed member, lower electrical feed member, or both, and said wire electrode.

31. The wire break detection system according to claim 30, wherein said adjusting means comprises upper and lower activating members respectively positioned to contact said upper and lower feed members and respectively positioned to said up and down signals to move its associated electrical feed member.

32. A method of detecting electrode wire breakage in a wire-cut electroerosion machining apparatus having a renewable wire electrode moveable in its axial direction through a working zone of said apparatus wherein a workpiece to be machined may be positioned, said wire electrode being held under tension and in contact with upper and lower electrical feed members, respectively disposed above and below said working zone, said workpiece being spaced from said wire electrode in said working zone by a working gap across which electrical machining pulses are impressed, said method comprising the steps of:
   detecting current flowing through at least one of said electrical feed members as a result of a machining pulse;
   amplifying the detected current and generating a spark position signal based on said amplified detected current signal;
   converting said spark discharge position signal into digital data;
   comparing said digital data with data representative of the upper and lower surfaces of said workpiece; and
   generating a wire break signal when said spark position data falls outside of said workpiece thickness.

33. The method according to claim 32, wherein the step of detecting further comprises the step of detecting a valve indicative of the peak current detected during a machining pulse.

34. The method according to claim 32, wherein the step of detecting further comprises detecting the current flowing through each of said upper and lower feed members and the step of amplifying further comprises differentially amplifying the detected current from said upper and lower feed members to thereby generate said spark position signal.

35. The method according to claim 32, wherein the step of generating a broken wire signal further comprises counting the number of times the spark position data indicates a spark discharge position outside of the workpiece thickness and generating said wire break signal when said count reaches a predetermined value.

36. A method of detecting electrical feed member wear in a wire-cut electroerosion machining apparatus having a renewable wire electrode moveable in its axial direction through a working zone of said apparatus wherein a workpiece to be machined may be positioned, said wire electrode being held under tension and in contact with a portion of an upper and a lower electrical feed member, respectively disposed above and below said working zone, said workpiece being spaced from said wire electrode in said working zone by a working gap across which electrical machining pulses are impressed, said method comprising the steps of:
   detecting current flowing through said electrical feed members as a result of a machining pulse;
   differentially amplifying the detected current flowing through each of said wire feed members and generating spark position signal data;
   comparing said spark position signal with data representative of the upper and lower surfaces of said workpiece; and
   generating an electrical feed member wear signal when said spark position signal data falls outside of said workpiece thickness after generation of spark position signal data indicative of a spark discharge positioned within the workpiece thickness.

37. The method according to claim 36, wherein the step of generating an electrical feed member wear signal further comprises the steps of counting the number of consecutive times said spark position signal data indicative of a spark discharge outside of said workpiece thickness is generated and generating a feed member wear signal if a predetermined count is not reached within a predetermined time.

38. The method according to claim 37, further comprising the step of adjusting the positioned electrical feed member in response to a feed member wear signal, whereby a new portion of said electrical feed member contacts said wire electrode.

39. The method according to claim 36, further comprising the step of discriminating whether the spark position data used to generate feed member wear signal is indicative of wear of the upper electrical feed member, lower electrical feed member, or both, and issuing a discrimination signal indicating the worn electrical feed member or members.

40. The method according to claim 39, further comprising the step of adjusting the position of the discriminated electrical feed member, whereby a new portion of said indicated electrical feed member contacts said wire electrode.

41. The method according to claim 39, wherein said step of discriminating further comprises generating a first signal if said spark position signal data is greater than a first value indicative of the top surface of said workpiece, and generating a second signal if said spark position signal data is less than a second value indicative of a bottom surface of said workpiece, and generating said discrimination based on said first and second signals.

* * * * *